US012410636B2

(12) United States Patent
McKibben et al.

(10) Patent No.: US 12,410,636 B2
(45) Date of Patent: Sep. 9, 2025

(54) EXIT DEVICE COORDINATION MECHANISMS

(71) Applicant: Schlage Lock Company LLC, Carmel, IN (US)

(72) Inventors: Aaron P. McKibben, Fishers, IN (US); Matthew S. Graham, Noblesville, IN (US); Gregory Musselman, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/512,466

(22) Filed: Nov. 17, 2023

(65) Prior Publication Data

US 2024/0344365 A1 Oct. 17, 2024

Related U.S. Application Data

(63) Continuation of application No. 16/042,214, filed on Jul. 23, 2018, now abandoned.

(60) Provisional application No. 62/671,518, filed on May 15, 2018.

(51) Int. Cl.
*E05B 65/10* (2006.01)

(52) U.S. Cl.
CPC ...... *E05B 65/1013* (2013.01); *E05B 65/1053* (2013.01); *E05B 65/1093* (2013.01)

(58) Field of Classification Search
CPC ........... Y10T 292/0908; Y10T 70/5159; Y10T 292/0822; Y10T 292/0975; Y10T 292/106; E05B 65/1053; E05B 65/1006; E05B 65/1093; E05B 65/1046; E05B 65/10; E05B 65/1013; E05B 15/004; E05B 65/1086; Y10S 292/65; Y10S 292/62; E05C 19/003
See application file for complete search history.

(56) References Cited

U.S. PATENT DOCUMENTS

| | | | | |
|---|---|---|---|---|
| 4,961,330 | A | 10/1990 | Evans | |
| 6,565,130 | B1 * | 5/2003 | Walsh, III | E05B 47/0002 292/201 |
| 8,042,843 | B2 | 10/2011 | Tien | |
| 8,201,857 | B2 | 6/2012 | Tien | |
| 8,267,440 | B2 * | 9/2012 | Shen | E05B 65/1006 292/DIG. 65 |

(Continued)

*Primary Examiner* — Mark A Williams
(74) *Attorney, Agent, or Firm* — Taft Stettinius & Hollister LLP

(57) ABSTRACT

An exemplary exit device includes a pushbar assembly, a remote latching assembly, and a coordination mechanism. The pushbar assembly includes a latch control assembly, and the coordination mechanism biases the latch control assembly toward its actuated state. The remote latching assembly includes first and second latch mechanisms, and the latch control assembly is operable to actuate the latch mechanisms. Each of the latch mechanisms at least selectively urges the latch control assembly toward its deactuated state such that the remote latching assembly exerts a variable deactuating force on the latch control assembly. The coordination mechanism selectively retains the latch control assembly in its actuated state, thereby selectively retaining at least one of the latch mechanisms in a corresponding actuated state. When the deactuating force exceeds a threshold force value, the latch control assembly and the latch mechanisms return to the deactuated states thereof.

20 Claims, 13 Drawing Sheets

(56) References Cited

U.S. PATENT DOCUMENTS

| | | | | |
|---|---|---|---|---|
| 8,495,836 | B2 * | 7/2013 | Lowder | E05B 65/1053 49/394 |
| 8,523,248 | B2 * | 9/2013 | Tien | E05B 65/104 292/DIG. 65 |
| 8,528,946 | B2 * | 9/2013 | Shen | E05B 65/1053 70/92 |
| 9,580,944 | B2 | 2/2017 | Arlinghaus et al. | |
| 10,072,444 | B2 | 9/2018 | Lehner, Jr. et al. | |
| 2004/0124639 | A1 * | 7/2004 | Lin | E05B 65/1073 292/92 |
| 2010/0007154 | A1 | 1/2010 | Schacht | |
| 2010/0045053 | A1 | 2/2010 | Dye et al. | |
| 2012/0242092 | A1 * | 9/2012 | Frolov | E05B 65/1093 292/92 |
| 2014/0102155 | A1 * | 4/2014 | Lin | E05C 9/046 70/92 |
| 2014/0109479 | A1 * | 4/2014 | Morstatt | E05B 65/1093 292/144 |
| 2015/0184426 | A1 * | 7/2015 | Arlinghaus | E05B 65/108 292/138 |
| 2016/0002963 | A1 * | 1/2016 | Kondi | E05B 65/1046 292/5 |
| 2016/0115719 | A1 * | 4/2016 | Coleman | E05B 17/2084 292/195 |
| 2016/0208525 | A1 * | 7/2016 | Arlinghaus | E05B 65/1006 |

* cited by examiner

EXIT DEVICE COORDINATION MECHANISMS

CROSS REFERENCE TO RELATED APPLICATIONS

The current application is a continuation of U.S. patent application Ser. No. 16/042,214 filed Jul. 23, 2018 which claims the benefit of U.S. Provisional Patent Application No. 62/671,518 filed May 15, 2018, the contents of each application are incorporated by reference in their entireties.

TECHNICAL FIELD

The present disclosure generally relates to exit devices, and more particularly but not exclusively relates to exit devices including one or more remote latching mechanisms.

BACKGROUND

Exit devices are commonly installed to doors to provide for rapid egress, and typically include one or more latching mechanisms and a pushbar assembly. Each latching mechanism is operable to engage a door frame to retain the door in a closed position, and the pushbar assembly is operable to retract or actuate the latching mechanisms to permit opening of the door. Certain exit devices include a remote latching assembly in which one or more of the latching mechanisms is positioned remotely from the pushbar assembly. Such remote latching assemblies typically include a top latch mechanism mounted at the top of the door, and often further include a bottom latch mechanism mounted at the bottom of the door. The latch mechanisms are typically connected to the pushbar assembly via a pair of connectors, such as rigid rods or flexible cables. Certain remote latching assemblies are mounted to the surface of the door, while others are concealed within a set of cavities and channels that are formed in the door.

One difficulty associated with remote latching assemblies of this type is that premature extension of the bottom bolt may cause the bolt to drag along the floor during movement of the door. To address this issue, certain existing exit devices include mechanisms that retain the bottom bolt in its retracted position until the door reaches its closed position. When the connectors are provided in the form of rods, the rigidity of the rods enables the top latch mechanism to exert a pushing force that can be used to retain the lower rod in its raised position, such as via a lever or rack and pinion assembly. Such rods are not without their drawbacks, however. For example, when used in a concealed remote latching assembly, rods typically require much larger cutouts than would be required by cables. Larger cutouts can reduce the structural integrity of the door, particularly in wood doors.

While flexible pull cables typically allow for smaller cutouts, their inability to transmit pushing forces complicates the selective retention of the bottom bolt in its retracted position. While certain existing remote latching assemblies include retention mechanisms that provide the desired functionality, these retention mechanisms typically require that the door be provided with a mortise cutout, which can also reduce the structural integrity of the door. Furthermore, the incorporation of such retention mechanisms in surface-mounted remote latching assemblies is hindered by the fact that these retention mechanisms typically cannot be mounted within the pushbar assembly itself. As such, certain surface-mounted remote latching mechanisms are restricted to the use of rods.

In light of the foregoing, it is evident that many existing exit devices suffer from certain limitations, such as those relating to selectively preventing extension of the bottom bolt while maintaining structural integrity of the door. For these reasons among others, there remains a need for further improvements in this technological field.

SUMMARY

An exemplary exit device includes a pushbar assembly, a remote latching assembly, and a coordination mechanism. The pushbar assembly includes a latch control assembly, and the coordination mechanism biases the latch control assembly toward its actuated state. The remote latching assembly includes first and second latch mechanisms, and the latch control assembly is operable to actuate the latch mechanisms. Each of the latch mechanisms at least selectively urges the latch control assembly toward its deactuated state such that the remote latching assembly exerts a variable deactuating force on the latch control assembly. The coordination mechanism selectively retains the latch control assembly in its actuated state, thereby selectively retaining at least one of the latch mechanisms in a corresponding actuated state. When the deactuating force exceeds a threshold force value, the latch control assembly and the latch mechanisms return to the deactuated states thereof. Further embodiments, forms, features, and aspects of the present application shall become apparent from the description and figures provided herewith.

Figure 1:
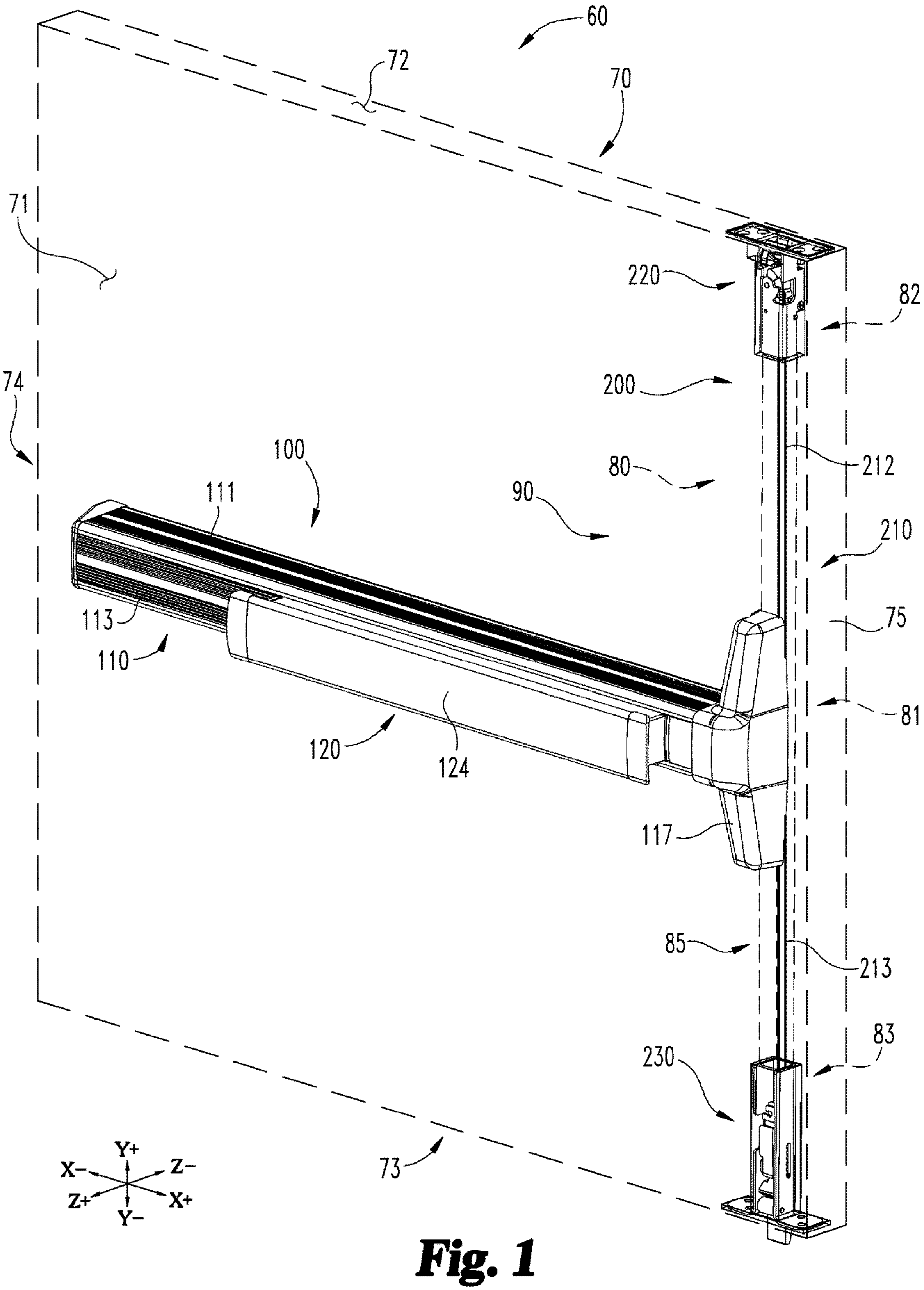
FIG. 1 is a perspective illustration of a closure assembly including a door and an exit device according to certain embodiments.

FIGS. *9a* through *9c* respectively illustrate a portion of the exit device illustrated in FIG. 1 with the closure assembly in a secured condition, an unsecured condition, and an open condition.

Figure 10:
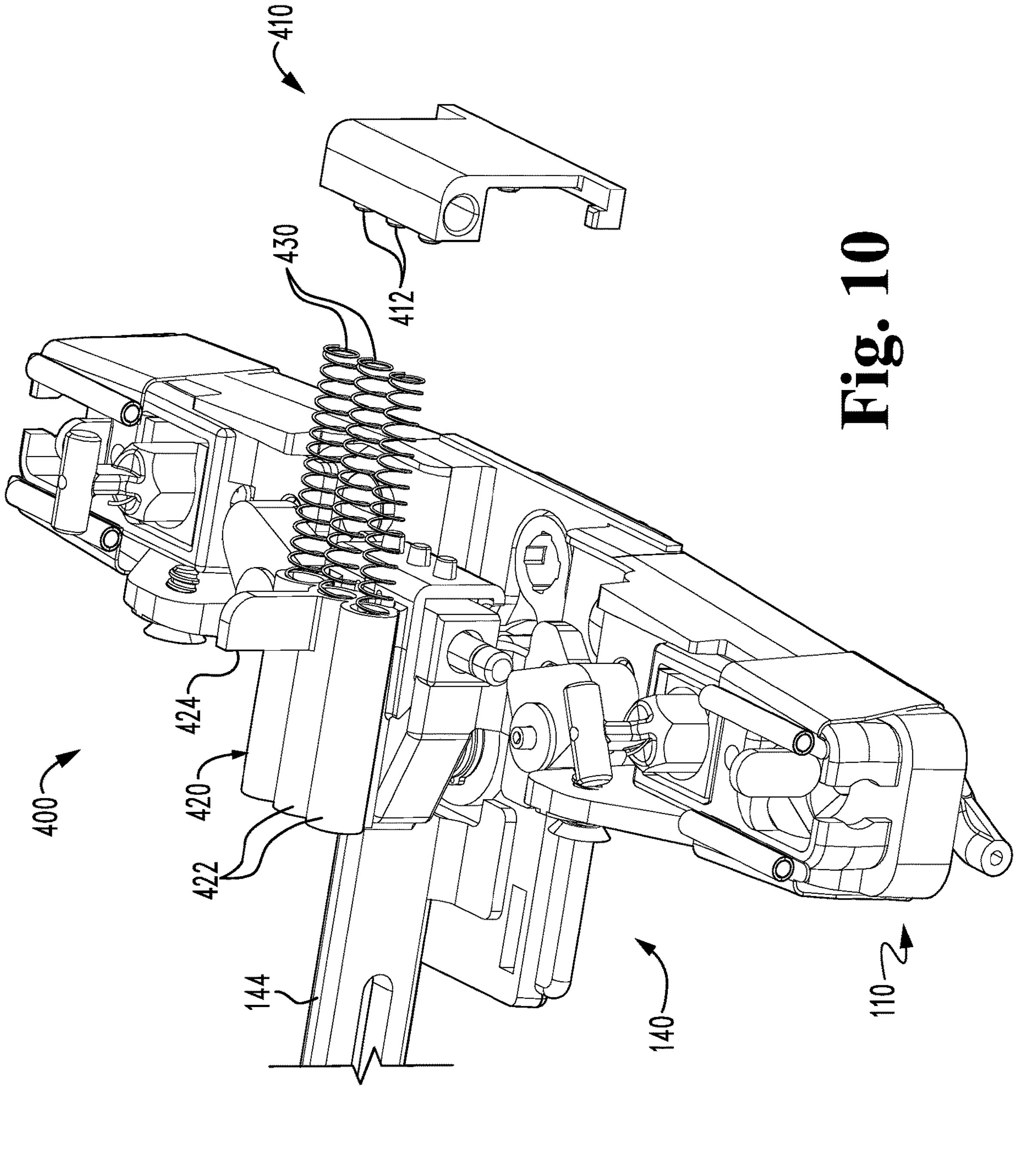

FIG. 10 is a perspective illustration of a coordination mechanism according to certain embodiments.

Figure 11:
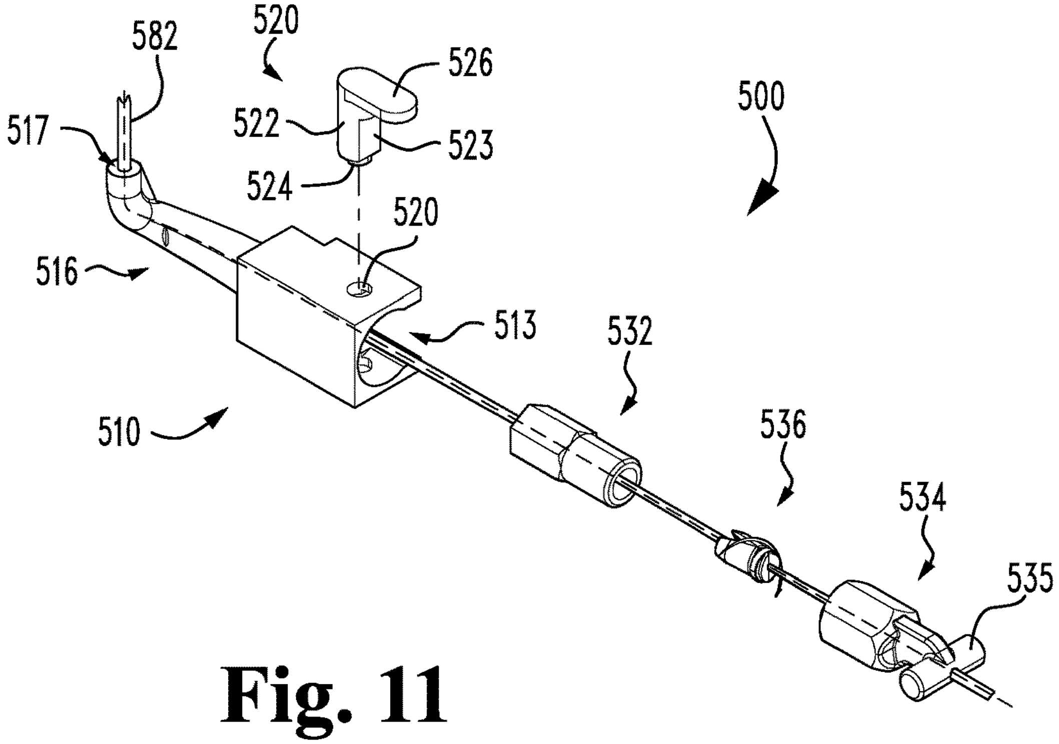

FIG. 11 is an exploded assembly illustration of a coupling assembly according to certain embodiments.

Figure 12:
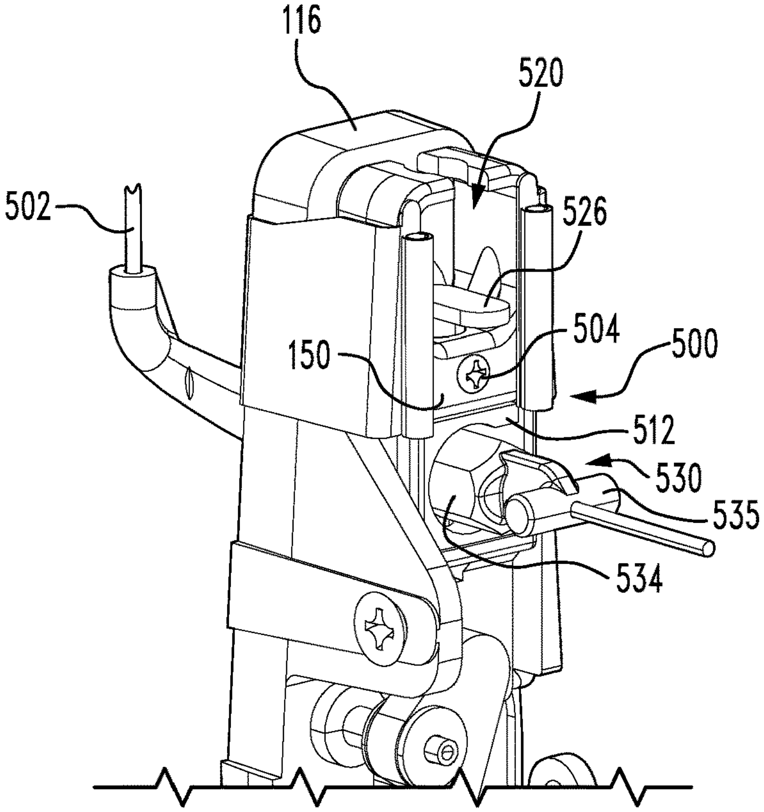

FIG. 12 is a perspective illustration of a portion of an exit device having the coupling assembly installed thereto.

Figure 13:
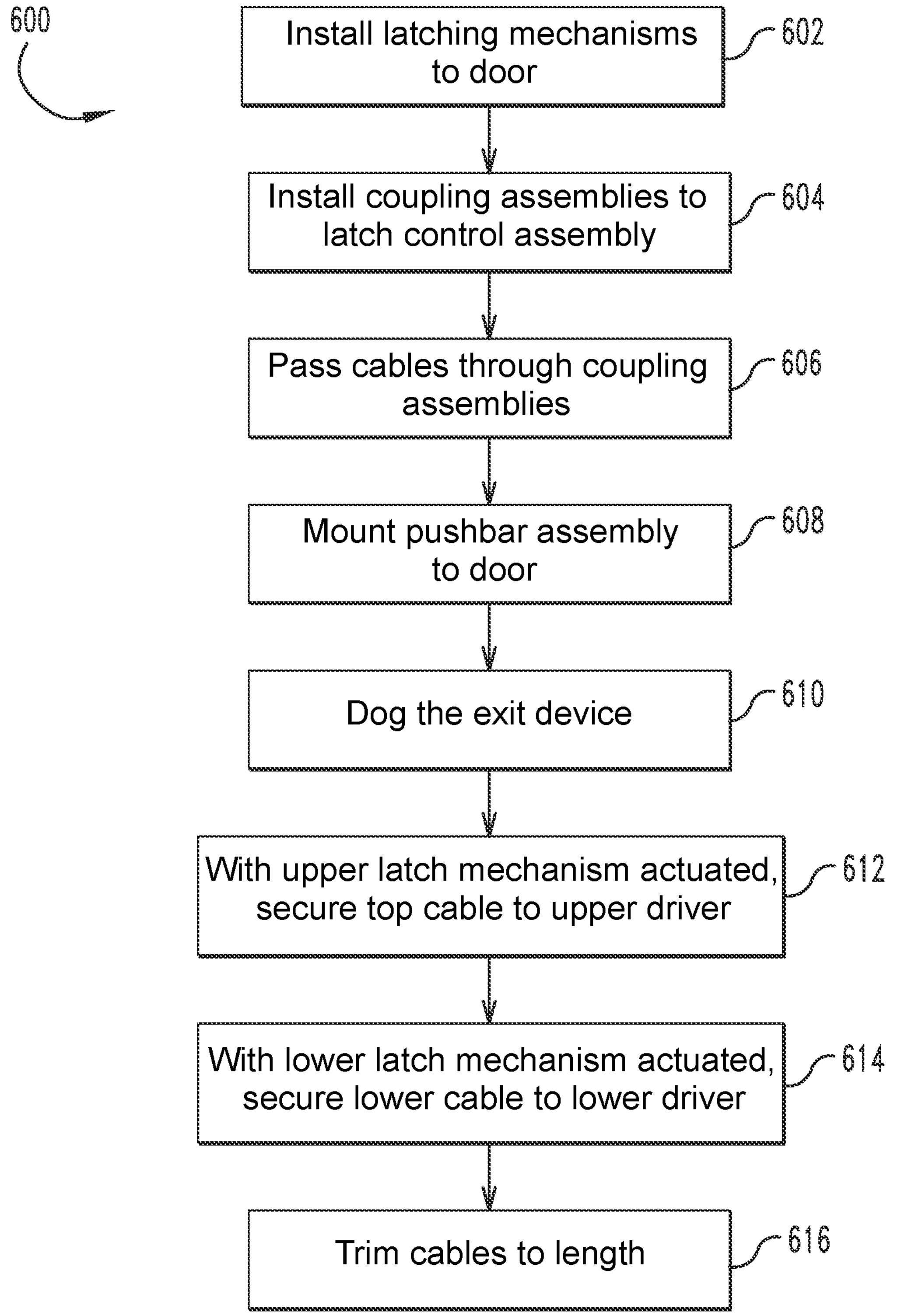

FIG. 13 is a schematic flow diagram of a process according to certain embodiments.

Figure 14:
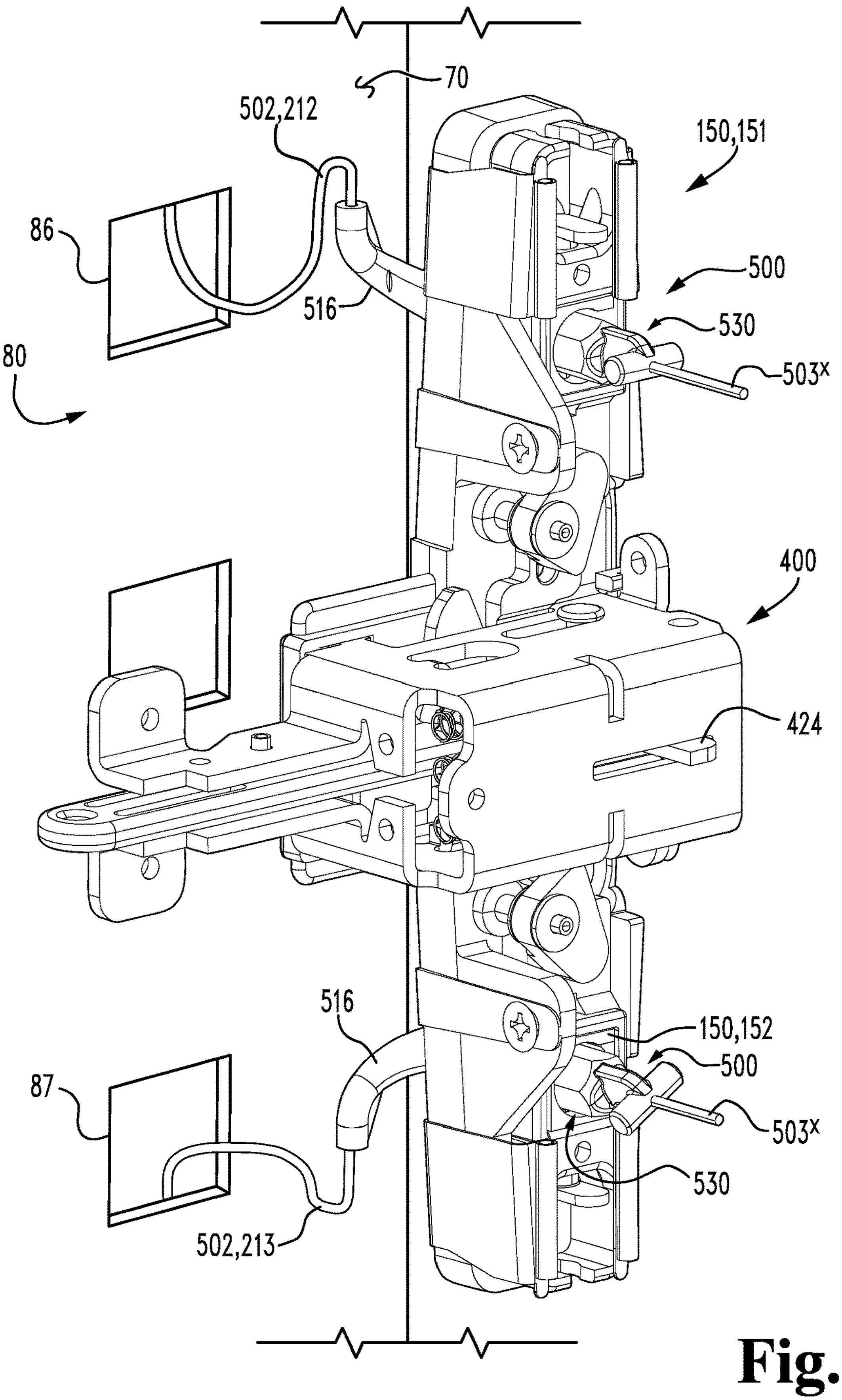

FIG. 14 illustrates a portion of an exit device during one stage of the process illustrated in FIG. 13.

Figure 15:
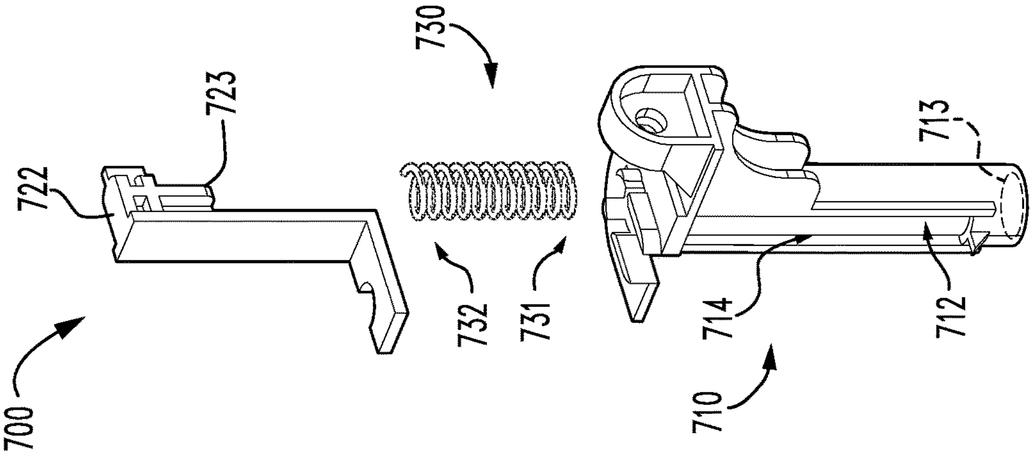

FIG. 15 is an exploded assembly view of a coordination mechanism according to certain embodiments.

Figure 16:
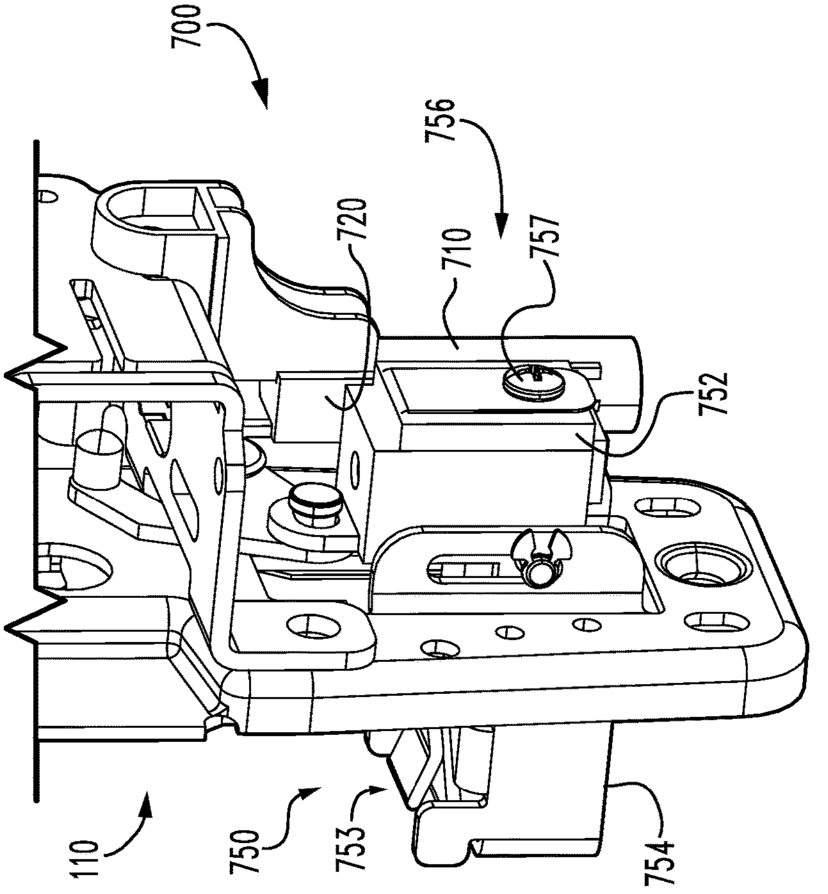

FIG. 16 illustrates a portion of an exit device having the coordination mechanism of FIG. 15 installed thereto.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings appended hereto, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As used herein, the terms "longitudinal," "lateral," and "transverse" are used to denote motion or spacing along three mutually perpendicular axes, wherein each axis defines two opposite directions. In the coordinate system illustrated in FIG. 1, the X-axis defines first and second longitudinal directions, the Y-axis defines first and second lateral directions, and the Z-axis defines first and second transverse directions. Additionally, the descriptions that follow may refer to the directions defined by the axes with specific reference to the orientations illustrated in the Figures. More specifically, the longitudinal (X) directions may be referred to as "proximal" ($X^+$) and "distal" ($X^-$), the lateral (Y) directions may be referred to as "upward" ($Y^+$) and "downward" ($Y^-$), and the transverse (Z) directions may be referred to as "forward" ($Z^+$) and "rearward" ($Z^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

With reference to FIG. 1, illustrated therein is a closure assembly 60 including a swinging door 70 and an exit device 90 mounted to the door 70. The door 70 is mounted to a doorframe for swinging movement between an open position and a closed position, and the exit device 90 is configured to selectively retain the door 70 in the closed position. In certain embodiments, the closure assembly 60 may be considered to further include the doorframe. As described herein, the closure assembly 60 has a plurality of states or conditions, including a secured condition, an unsecured condition, and an open condition. In the secured condition, the door 70 is in its closed position, the exit device 90 is in a deactuated state, and the exit device 90 engages the doorframe and retains the door 70 in its closed position. Actuation of the exit device 90 causes the closure assembly 60 to transition to the unsecured condition, in which the door 70 is capable of being moved from its closed position to its open position. Such movement of the door 70 to its open position causes the closure assembly 60 to transition to the open condition.

The door 70 has an interior side surface 71, an exterior side surface opposite the interior side surface 71, a top edge 72, a bottom edge 73, a hinge edge 74 at which the door 70 is pivotally mounted to the doorframe, and a free edge 75 opposite the hinge edge. The door 70 also has a door preparation 80 that facilitates the mounting of the exit device 90. In the illustrated form, the door preparation 80 is formed near the free edge 75, and includes a channel preparation 81 formed between the interior side surface 71 and the exterior side surface, an upper cavity 82 extending downward from the top edge 72, and a lower cavity 83 extending upward from the bottom edge 73. The channel preparation 81 includes an upper channel 84 extending downward from the upper cavity 83, and a lower channel 85 extending upward from the lower cavity 83. In certain forms, the upper channel 84 and lower channel 85 may be discrete channels that do not connect to one another. In other forms, the upper channel 84 and lower channel 85 may be provided as upper and lower portions of a contiguous channel preparation 81.

The door preparation 80 also includes an access arrangement 88 (FIG. 3) that is formed in the interior side surface 71, and which includes at least one aperture through which the channel preparation 81 is accessible. As a result, each of the cavities 82, 83 is in communication with the access arrangement 88 via the channel preparation 81. In the illustrated form, the access arrangement 88 includes an upper aperture 86 and a lower aperture 87, each of which is in communication with a corresponding one of the cavities 82, 83 via the channel preparation 81. More specifically, the upper aperture 86 is in communication with the upper cavity 82 via the upper channel 84, and the lower aperture 87 is in communication with the lower cavity 83 via the lower channel 85. In other embodiments, the access arrangement 88 may be provided in the form of a single aperture through which both the upper and lower portions of the channel preparation 81 are accessible.

Figure 2:
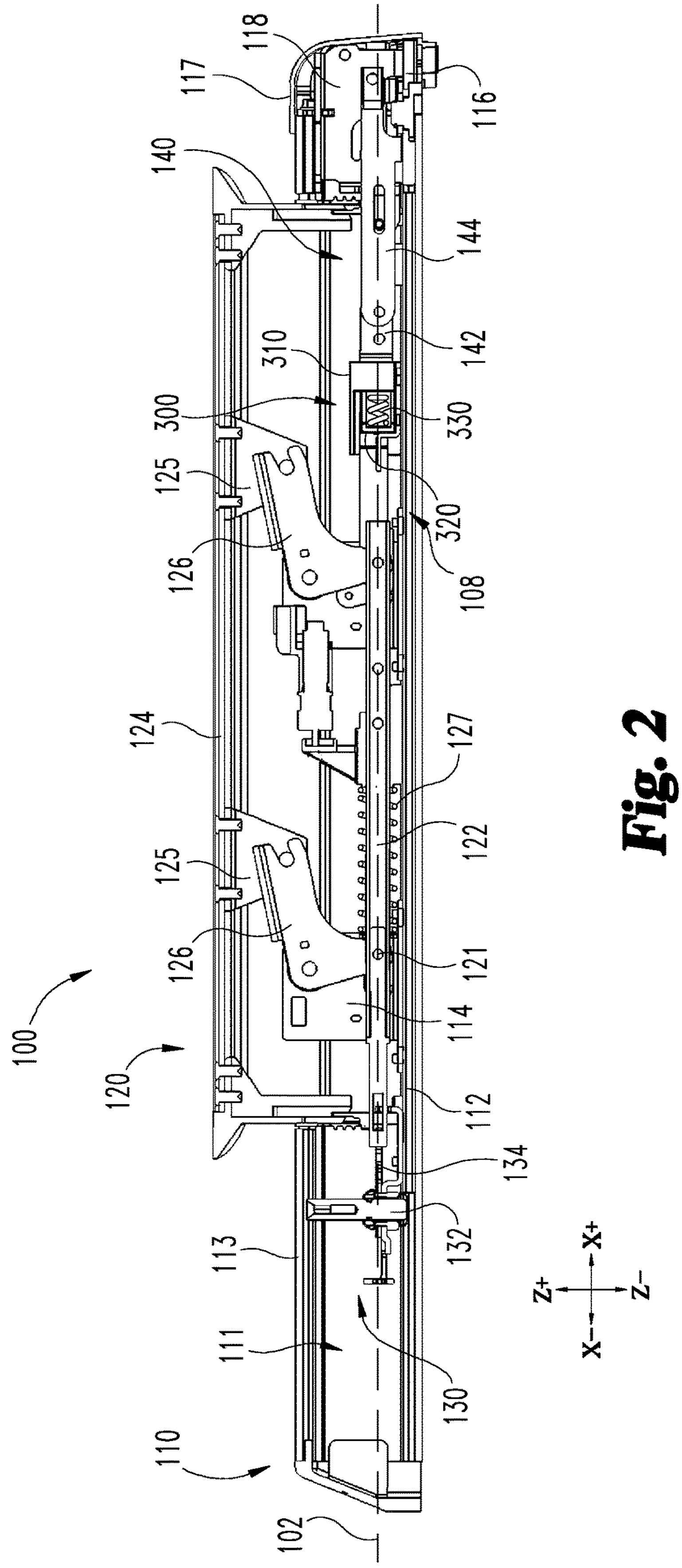
FIG. 2 is a cross-sectional illustration of a pushbar assembly according to certain embodiments.

With additional reference to FIG. 2, the exit device 90 generally includes a pushbar assembly 100, a remote latching assembly 200 operably connected with the pushbar assembly 100, and a coordination mechanism 300 that aids in controlling the operation of the remote latching assembly 200. The pushbar assembly 100 generally includes a mounting assembly 110 configured for mounting to the door 70, a drive assembly 120 mounted to the mounting assembly 110 for movement between an actuated state and a deactuated state, and a latch control assembly 140 operably connected with the drive assembly 120 via a lost motion connection 108. As described herein, the drive assembly 120 is biased toward the deactuated state, and is operable to be driven to the actuated state when manually actuated by a user. The latch control assembly 140 also has an actuated state and a deactuated state, and is operably connected with the drive assembly 120 such that actuation of the drive assembly 120 causes a corresponding actuation of the latch control assembly 140. The pushbar assembly 100 may further include a dogging mechanism 130 operable to selectively retain the drive assembly 120 and the latch control assembly 140 in the actuated states thereof, thereby dogging the exit device 90.

The remote latching assembly 200 generally includes a connection assembly 210 mounted in the channel preparation 81, an upper latch mechanism 220 mounted in the upper cavity 82, and a lower latch mechanism 230 mounted in the lower cavity 83. As described herein, each of the upper latch mechanism 220 and the lower latch mechanism 230 is operably connected with the pushbar assembly 100 via the connection assembly 210 such that the pushbar assembly 100 is capable of actuating the remote latching assembly 200.

As described in further detail below, the coordination mechanism 300 aids in coordinating the movement of the latch mechanisms 220, 230 during operation of the closure assembly 60. In the illustrated embodiment, the coordination mechanism 300 is positioned in the pushbar assembly 100, and includes an anchor bracket 310 securely mounted to the mounting assembly 110, a cup 320 engaged with the latch control assembly 140, and a spring 330 that is seated in the cup 320 and engaged with the bracket 310.

The mounting assembly 110 generally includes an elongated channel member 111, a base plate 112 mounted in the channel member 111, and a pair of bell crank mounting brackets 114 coupled to the base plate 112. The channel member 111 extends along the longitudinal (X) axis 102, has a width in the lateral (Y) directions, and has a depth in the transverse (Z) directions. Each of the mounting brackets 114 includes a pair of laterally-spaced walls 115 that extend away from the base plate 112 in the forward ($Z^+$) direction. The illustrated mounting assembly 110 also includes a face plate 113 that encloses a distal end portion of the channel member 111, a header plate 116 positioned adjacent a proximal end of the channel member 111, and a header casing 117 mounted to the header plate 116.

The drive assembly 120 includes a drive rod 122 extending along the longitudinal axis 102, a pushbar 124 having a pair of pushbar brackets 125 mounted to the rear side thereof, and a pair of bell cranks 126 operably connecting the drive rod 122 with the pushbar 124. As described herein, the drive rod 122 is mounted for movement in the longitudinal (X) directions, the pushbar 124 is mounted for movement in the transverse (Z) directions, and the bell cranks 126 couple the drive rod 122 and the pushbar 124 for joint movement during actuation and deactuation of the drive assembly 120. Each bell crank 126 is pivotably mounted to a corresponding one of the bell crank mounting brackets 114, and includes a first arm that is pivotably connected to the drive rod 122, and a second arm that is pivotably connected to a corresponding one of the pushbar brackets 125. The pivotal connections may, for example, be provided by pivot pins 121. The drive assembly 120 further includes a return spring 127 that is engaged with the mounting assembly 110 and which biases the drive assembly 120 toward its deactuated state.

Each of the drive rod 122 and the pushbar 124 has an actuated position in the actuated state of the drive assembly 120, and a deactuated position in the deactuated state of the drive assembly 120. During actuation and deactuation of the drive assembly 120, the drive rod 122 moves in the longitudinal (X) directions between a proximal deactuated position and a distal actuated position, and the pushbar 124 moves in the transverse (Z) directions between a projected or forward deactuated position and a depressed or rearward actuated position. Thus, during actuation of the drive assembly 120, the drive rod 122 moves in the distal ($X^-$) direction, and the pushbar 124 moves in the rearward ($Z^-$) direction. Conversely, during deactuation of the drive assembly 120, the drive rod 122 moves in the proximal ($X^+$) direction, and the pushbar 124 moves in the forward ($Z^+$) direction. The bell cranks 126 translate longitudinal movement of the drive rod 122 to transverse movement of the pushbar 124, and translate transverse movement of the pushbar 124 to longitudinal movement of the drive rod 122. Thus, the longitudinal movement of the drive rod 122 and the transverse movement of the pushbar 124 are bijectively correlated with one another by the bell cranks 126.

With the drive assembly 120 in its deactuated state, a user may depress the pushbar 124 to transition the drive assembly 120 to its actuated state. As the pushbar 124 is driven toward its depressed position, the bell cranks 126 translate the rearward movement of the pushbar 124 to distal movement of the drive rod 122, thereby compressing the return spring 127. When the actuating force is subsequently removed from the pushbar 124, the spring 127 returns the drive rod 122 to its proximal position, and the bell cranks 126 translate the proximal movement of the drive rod 122 to forward movement of the pushbar 124, thereby returning the drive assembly 120 to its deactuated state.

The dogging mechanism 130 generally includes a post 132 mounted to the mounting plate 112 and a dogging hook 134 pivotably mounted to the post 132. When the drive assembly 120 is in its actuated state, an opening formed in the distal end portion of the drive rod 122 is aligned with the dogging hook 134. In this state, the dogging hook 134 can be pivoted between a dogging position and a releasing position. In the dogging position, the hook 134 extends into the opening such that the dogging mechanism 130 retains the drive rod 122 in its distal position against the biasing force of the return spring 127, thereby retaining the drive assembly 120 in its actuated state and dogging the exit device 100. As the hook 134 is returned to its release position, the hook 134 exits the opening, and the drive rod 122 becomes free to return to its deactuated position under the biasing force of the return spring 127.

Figure 3:
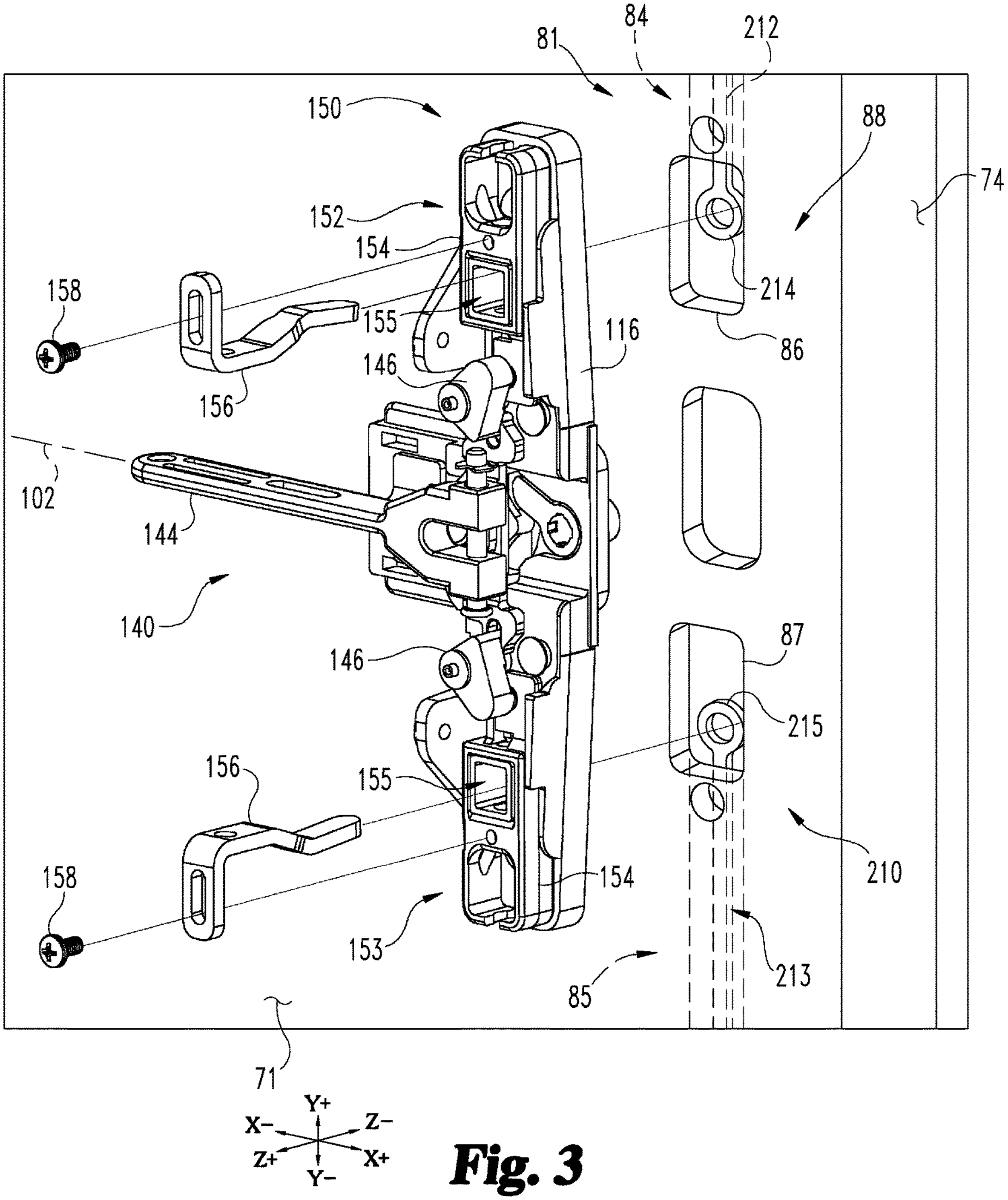
FIG. 3 is a partially-exploded assembly view of a portion of the closure assembly illustrated in FIG. 1.

With additional reference to FIG. 3, the latch control assembly 140 generally includes a control link 142 and a yoke 144, which are coupled for joint movement with one another along the longitudinal (X) axis 102. The latch control assembly 140 further includes a pair of pivot cranks 146 pivotally mounted to the header plate 116, and a pair of drivers 150 mounted to the header plate 116 for movement in the lateral (Y) directions. The pair of drivers 150 includes an upper driver 152 and a lower driver 153, each of which is operably connected with the yoke 144 via a corresponding one of the pivot cranks 146. Each pivot crank 146 includes a first portion that is pivotably connected to the yoke 144, and a second portion that is pivotably connected to a corresponding one of the drivers 150.

The control link 142 is operably connected with the drive assembly 120 via the lost motion connection 108 such that actuation of the drive assembly 120 causes a corresponding actuation of the latch control assembly 140. Each of the control link 142, the yoke 144, the upper driver 152, and the lower driver 153 has a deactuated position in the deactuated state of the latch control assembly 140, and an actuated position in the actuated state of the latch control assembly 140. Each of the control link 142 and the yoke 144 has a proximal deactuated position and a distal actuated position, and moves in the longitudinal (X) directions during actuation and deactuation of the latch control assembly 140. Each of the drivers 150 has a laterally-outward deactuated position and a laterally-inward actuated position, and moves in the lateral (Y) directions during actuation and deactuation of the latch control assembly 140.

As used herein, the terms "laterally inward" and "laterally outward" may be used to describe the lateral (Y) directions with reference to the longitudinal (X) axis 102 along which the drive rod 122 and the yoke 144 extend. More specifically, the term "laterally inward" may be used to describe a lateral (Y) direction extending toward the longitudinal (X) axis 102, and the term "laterally outward" may be used to describe a lateral (Y) direction extending away from the longitudinal (X) axis 102. Thus, for the upper driver 152, the laterally inward direction is the downward ($Y^-$) direction, and the laterally outward direction is the upward ($Y^+$) direction. For the lower driver 153, by contrast, the laterally inward direction is the upward ($Y^+$) direction, and the laterally outward direction is the downward ($Y^-$) direction.

During actuation and deactuation of the latch control assembly 140, the pivot cranks 146 convert longitudinal movement of the yoke 144 to lateral movement of the drivers 150 and vice versa. With the latch control assembly 140 in its deactuated state, actuation of the drive assembly 120 causes the control link 142 and the yoke 144 to move in the distal ($X^-$) direction toward the actuated positions thereof. As the yoke 144 is driven toward its actuated position, the pivot cranks 146 translate the distal movement of the yoke 144 to laterally-inward movement of the drivers 150, thereby moving the drivers 150 to the actuated positions thereof. With the latch control assembly 140 in its actuated state, the lost motion connection 108 may allow the drive assembly 120 to return to its deactuated state without causing a corresponding deactuation of the latch control assembly 140. When an appropriate deactuating force is exerted on the latch control assembly 140, for example by the remote latching assembly 200, the latch control assembly 140 returns to its deactuated state. During deactuation of the latch control assembly 140, the yoke 144 and the drivers 150 return to the deactuated positions thereof, and the pivot cranks 146 correlate the laterally-outward movement of the drivers 150 with the proximal movement of the yoke 144 and control link 142.

Each of the illustrated drivers 150 includes a body portion 154 slidably mounted to the header plate 116 for movement in the lateral (Y) directions, and a lift finger 156 coupled with the body portion 154 via a fastener, such as a screw 158. The lift finger 156 extends through into the channel preparation 81 via the access arrangement 88 and an opening 155 in the body portion 154. In the illustrated form, the lift finger 156 of the upper driver 152 extends into the upper channel 84 via the upper aperture 86, and the lift finger 156 of the lower driver 153 extends into the lower channel 85 via the lower aperture 87. As described herein, the lift fingers 156 are engaged with the connection assembly 210 such that the latch control assembly 140 and the remote latching assembly 200 are operably connected with one another.

In the illustrated form, the remote latching assembly 200 is of the type often referred to as a "concealed" remote latching assembly. More specifically, the illustrated remote latching assembly 200 is mounted within the door preparation 80 such that the connection assembly 210 and the latching mechanisms 220, 230 are primarily concealed from view. It is also contemplated that the remote latching assembly 200 may be of the type often referred to as a "surface" remote latching assembly, which is configured for mounting to the interior side surface 71 of the door 70. In such forms, the door preparation 80 may omit one or more features configured for use with the concealed remote latching assembly 200, such as the cavities 82, 83 and/or the channels 84, 85.

The connection assembly 210 includes an upper connector 212 and a lower connector 213, each of which is operably connected with the latch control assembly 140. Each of the connectors 212, 213 has a laterally inward portion that is coupled with the lift finger 156 of a corresponding one of the drivers 152, 153. More specifically, the upper connector 212 has a lower end 214 coupled with the lift finger 156 of the upper driver 152, and the lower connector 213 has an upper end 215 coupled with the lift finger 156 of the lower driver 153. Each of the connectors 212, 213 also has a laterally outward portion that is coupled with a movable link member of a corresponding one of the latch mechanisms 220, 230. More specifically, the upper connector 212 has an upper end 216 coupled to a linkage 226 of the upper latch mechanism 220 (FIG. 4), and the lower connector 213 has a lower end 217 coupled to a linkage 236 of the lower latch mechanism 230 (FIG. 5).

In the illustrated embodiment, the connectors 212, 213 are provided in the form of flexible cables. More specifically, each of the connectors 212, 213 is provided as a pull cable that is operable to transmit pulling forces, but which cannot transmit pushing forces. In other embodiments, one or both of the connectors 212, 213 may be provided in a form that is capable of transmitting pushing forces in addition to pulling forces. Such push/pull forms of connectors may be provided in a form that is flexible, such as a sheathed or Bowden cable, or may alternatively be provided in a form that is rigid, such as a rigid rod.

Figure 4:
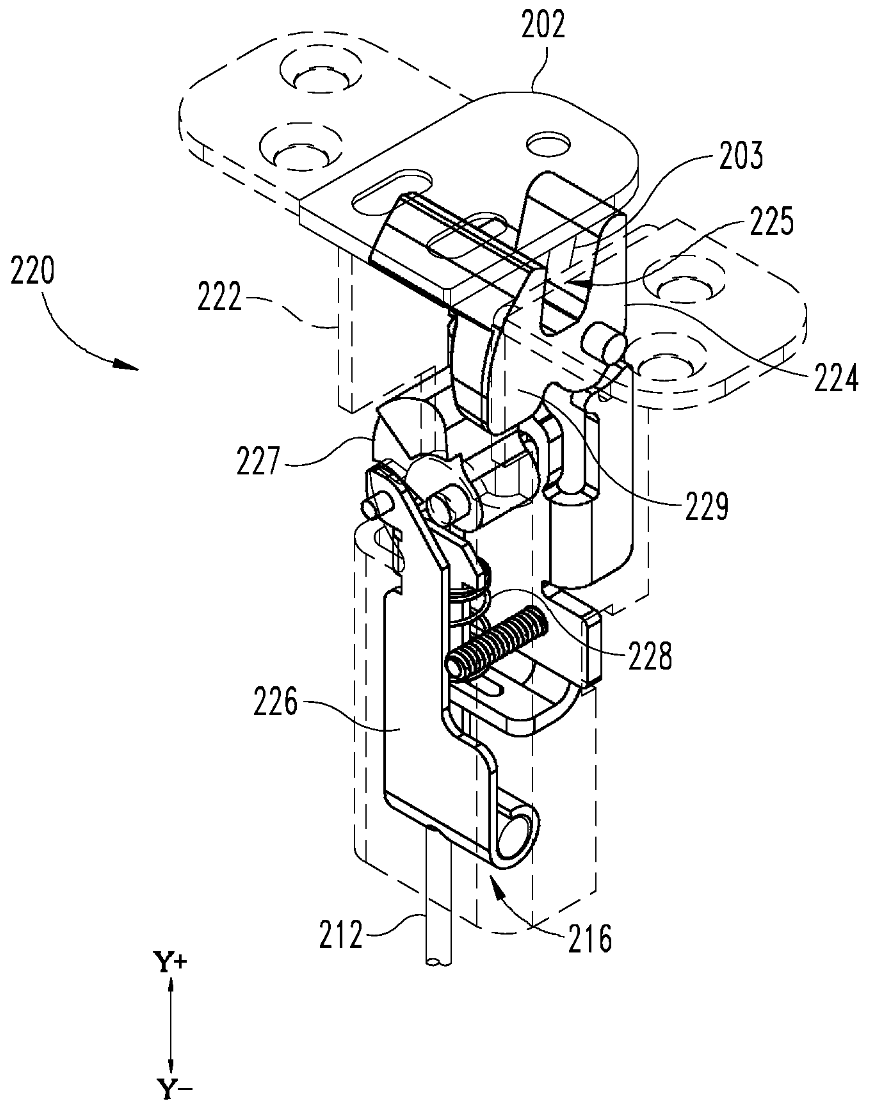
FIG. 4 is a perspective illustration of a top latch mechanism that may be utilized in connection with certain embodiments.
Figure 5:
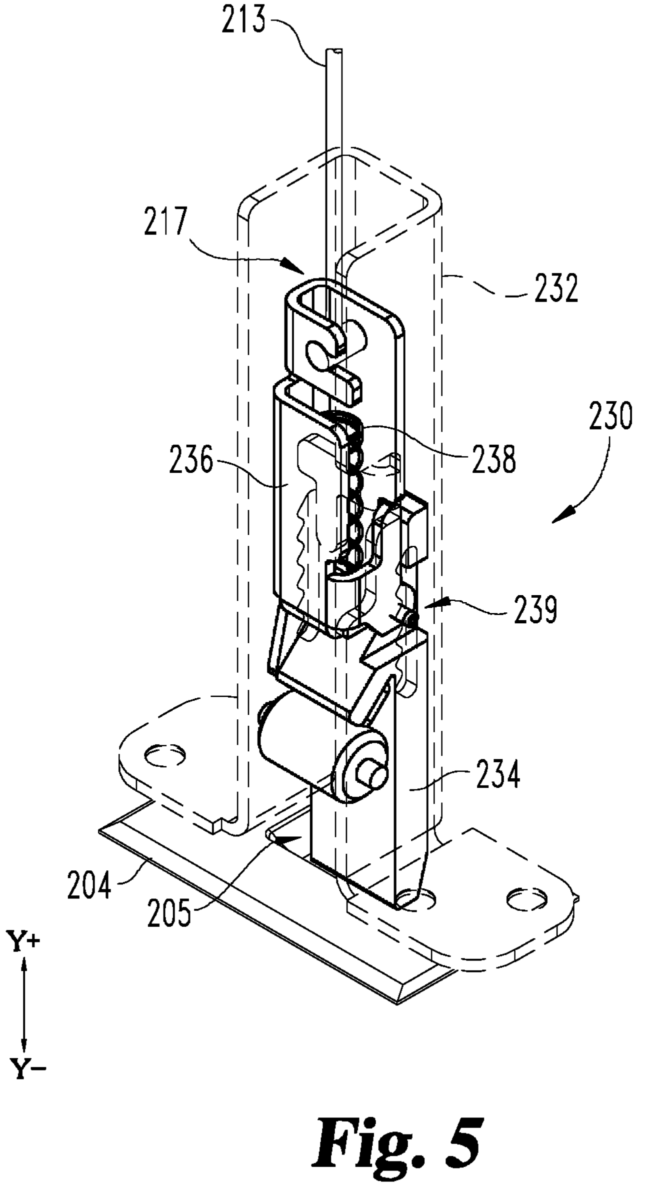
FIG. 5 is a perspective illustration of a bottom bolt mechanism that may be utilized in connection with certain embodiments.

With additional reference to FIG. 4, the upper latch mechanism 220 generally includes a housing 222, a latchbolt 224 mounted to the housing 222 for pivotal movement between a latching position and an unlatching position, the linkage 226 to which the upper end 216 of the upper connector 212 is coupled, and a blocking member 227 mounted to the housing 222 for pivotal movement between a blocking position and an unblocking position. The linkage 226 is pivotably connected to the blocking member 227 such that lateral movement of the linkage 226 is correlated with the pivotal movement of the blocking member 227. More specifically, downward or laterally inward movement of the linkage 226 is correlated with movement of the blocking member 227 toward its unblocking position, and upward or laterally outward movement of the linkage 226 is correlated with movement of the blocking member 227 toward its blocking position. The upper latch mechanism 220 also includes a spring 228 urging the linkage 226 in the upward or laterally outward direction, thereby biasing the blocking member 227 toward its blocking position.

When in its blocking position, the blocking member 227 retains the latchbolt 224 in its latching position. As the upper connector 212 pulls the linkage 226 in the downward or laterally inward direction against the force of the spring 228, the blocking member 227 moves toward its unblocking position, and the latchbolt 224 becomes free to move to its unlatching position. When in its unlatching position, the latchbolt 224 retains the blocking member 227 in its blocking position against the biasing force of the spring 228. More specifically, a retaining member 229 formed on the latchbolt 224 projects into the path along which the blocking member 227 travels when moving from its unblocking position to its blocking position, thereby preventing such travel of the blocking member 227. When the latchbolt 224 returns to its latching position, the biasing member 228 returns the blocking member 227 to its blocking position, and the latchbolt 224 is once again retained in its latching position.

Also illustrated in FIG. 4 is an upper strike 202 configured to be mounted to the upper jamb of the doorframe in which the door 70 is installed. In certain embodiments, the upper strike 202 may be considered to constitute a portion of the frame. The upper strike 202 includes a projection 203 which, when the door 70 is in its closed position, extends into a channel 225 formed in the latchbolt 224. When the door 70 is pushed in its opening direction, the projection 203 urges the latchbolt 224 toward its unlatching position. When the blocking member 227 is in its blocking position, such unlatching movement of the latchbolt 224 is prevented, and engagement between the latchbolt 224 and the upper strike 202 prevents opening movement of the door 70. When the blocking member 227 is in its unblocking position, opening movement of the door 70 drives the latchbolt 224 toward its unlatching position.

With the door 70 in its open position, the latchbolt 224 is maintained in its unlatching position, for example due to a biasing member or gravity urging the latchbolt 224 toward its unlatching position. Thus, the latchbolt 224 retains the blocking member 227 in its unblocking position while the door 70 is open. When the door 70 is returned to its closed position, the projection 203 enters the channel 225 and returns the latchbolt 224 to its latching position. As the latchbolt 224 returns to its latching position, the retaining member 229 pivots therewith, thereby freeing the blocking member 227 to travel toward its blocking position. The spring 228 thus returns the blocking member 227 to its blocking position, thereby driving the upper end 216 of the upper connector 212 in the upward or laterally-outward direction.

With additional reference to FIG. 5, the lower latch mechanism 230 generally includes a housing 232, a deadbolt 234 mounted to the housing 232 for movement between an extended position and a retracted position, a linkage or traveler 236 movably mounted to the housing 232, and a biasing member 238 urging the traveler 236 in the downward or laterally-outward direction. Also illustrated in FIG. 5 is a lower strike 204 configured to be mounted to the lower jamb or floor of the doorframe in which the door 70 is installed. In certain embodiments, the lower strike 204 may be considered to constitute a portion of the frame. The strike 204 includes a pocket 205 which, when the door 70 is in its closed position, is operable to receive the lower end of the deadbolt 234 when the deadbolt 234 is in its extended position.

The traveler 236 is engaged with the deadbolt 234 such that an externally-applied pushing force exerted on the bottom of the deadbolt 234 actuates a deadlocking mechanism 239 of the lower latch mechanism 230. More specifically, such a pushing force on the deadbolt 234 drives the traveler 236 into engagement with the housing 232, thereby preventing further laterally-inward movement of the deadbolt 234. The traveler 236 is coupled to the lower end 217 of the lower connector 213 such that the traveler 236 retracts the deadbolt 234 in response to movement of the lower connector 213 in the upward or laterally-inward direction. Thus, retraction or laterally-inward movement of the lower connector 213 causes the deadbolt 234 to exit the pocket 205, thereby permitting opening of the door 70. As described herein, the lower connector 213 is retained in this retracted position until the door 70 returns to its closed position. When the lower connector 213 subsequently becomes free to move in the laterally-outward direction, the biasing member 238 drives the traveler 236 downward, thereby causing a corresponding downward or laterally-outward movement of the lower end 217 of the lower connector 213. Such downward movement of the traveler 236 also drives the deadbolt 234 to its extended position, thereby causing the end portion of the deadbolt 234 to enter the pocket 205.

Figure 6:
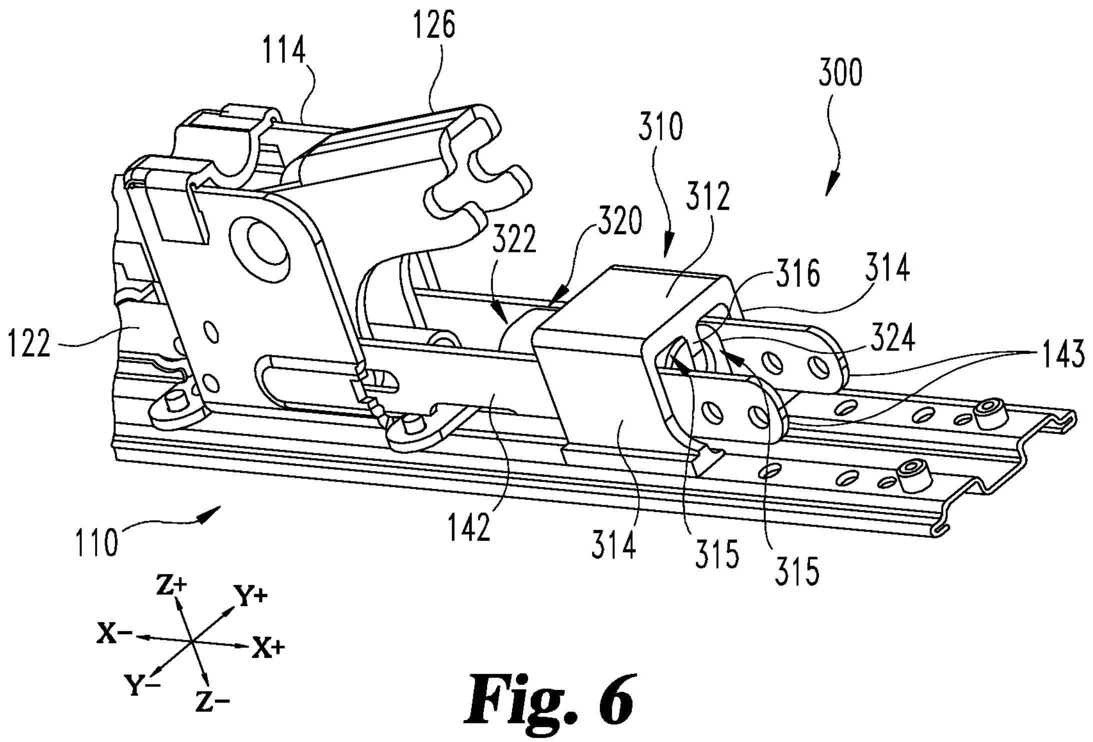
FIG. 6 is a perspective illustration of a coordination mechanism according to certain embodiments.
Figure 7:
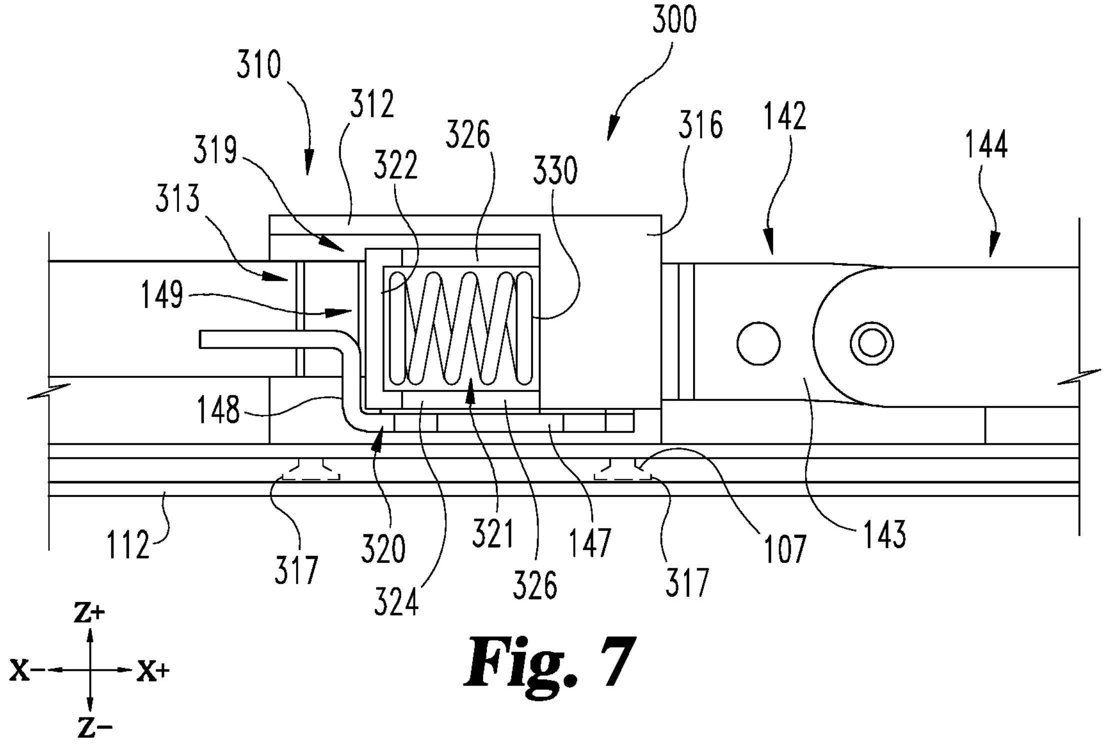
FIG. 7 is a cross-sectional illustration of the coordination mechanism illustrated in FIG. 6.

With additional reference to FIGS. 6 and 7, the coordination mechanism 300 is configured to selectively retain the latch control assembly 140 in its actuated state, and generally includes an anchor bracket 310, a cup 320, and a spring 330. In the illustrated embodiment, the coordination mechanism 300 is mounted in the pushbar assembly 100 in the vicinity of the lost motion connection 108, and exerts a proximal biasing force on the control link 142. Additionally, the illustrated control link 142 is provided in the form of a split link or a fork link, and includes two longitudinally-extending arms 143 that are offset from one another in the lateral (Y) directions, a base plate 147 connecting the arms 143 to one another, and a shoulder 148 extending from the base plate 147. The arms 143, base plate 147, and shoulder 148 cooperate to define a receiving space 149 that is sized and shaped to receive the cup 320.

The anchor bracket 310 is securely mounted to the mounting assembly 110, and in certain embodiments, may be considered to be included in the mounting assembly 110. The illustrated bracket 310 includes a base wall 312 and a pair of sidewalls 314 extending from opposite ends of the base wall 312 such that a receiving space 319 is defined therebetween. The proximal end portion of the bracket 310 also includes a flange 316 that extends from the base wall 312 such that a pair of channels 315 are formed between the flange 316 and the sidewalls 314. Thus, the proximal end portion of the bracket 310 has a generally E-shaped cross-section in which the receiving space 319 is divided into two channels 315, and the distal end portion of the bracket 310 has a generally C-shaped cross-section in which the receiving space 319 defines a single channel 313.

The cup 320 is sized and shaped to be received in the receiving spaces 149, 319, and defines a chamber 321 sized and shaped to receive the spring 330. The cup 320 includes an end wall 322 and a sleeve 324, which cooperate to at least partially define the chamber 321. The sleeve 324 defines at least one slot 326, through which the flange 316 extends into the chamber 321. In the illustrated form, a pair of diametrically opposite slots 326 extend distally from the proximal end of the sleeve 324, and the flange 316 is partially received in each of the slots 326.

With the coordination mechanism 300 installed to the pushbar assembly 100, the bracket 310 is secured to the mounting plate 112 such that the control link 142 extends therethrough. By way of example, the mounting plate 112 may include a series of apertures 107, and spring clips or snap-fit posts 317 may extend from the ends of the sidewalls 314 and matingly engage two or more of the apertures 107. Each of the arms 143 extends through a corresponding one of the channels 315 such that the flange 316 extends into the gap between the arms 143, thereby supporting and guiding the cup 320 as the cup 320 moves longitudinally.

At least a portion of the base plate 147 is positioned between the sidewalls 314 such that the receiving spaces 149, 319 intersect one another, and the cup 320 is seated in the receiving spaces 149, 319 and captured between the control link 142 and the bracket 310. More specifically, the cup 320 is transversely captured between the base plate 147 and the base wall 312, and is laterally captured between the arms 143. Additionally, the end wall 322 is longitudinally captured between the shoulder 148 and the flange 316, which extends into the chamber 321 via one of the slots 326. The spring 330 is seated in the chamber 321 and captured between the flange 316 and the end wall 322, thereby distally urging the end wall 322 into contact with the shoulder 148 and resisting movement of the control link 142 in the proximal ($X^+$) direction. Thus, the coordination mechanism 300 is operable urge the latch control assembly 140 toward its actuated state, and to resist movement of the latch control assembly 140 toward its deactuated state.

Figure 8:
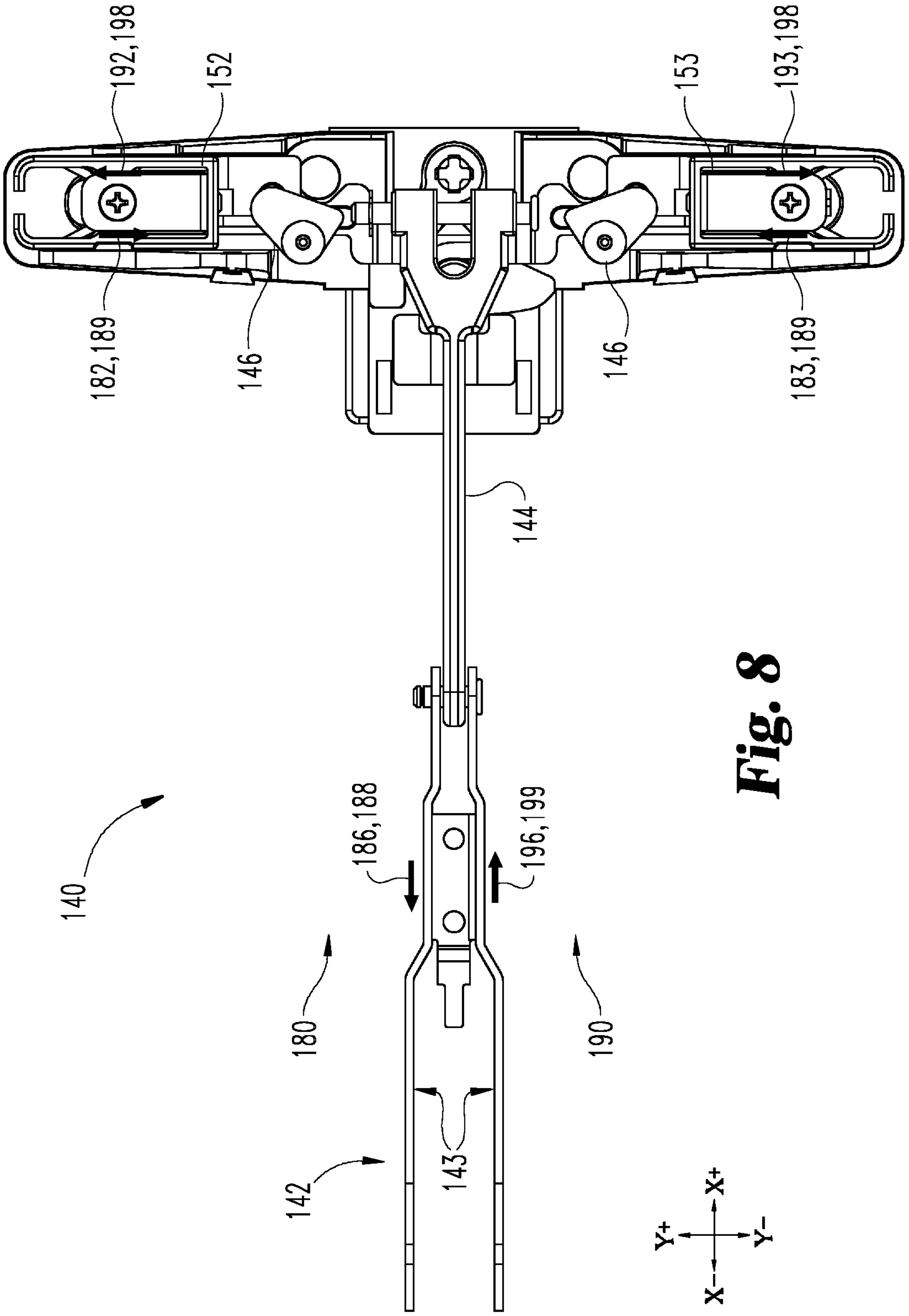
FIG. 8 is a plan view of a portion of the pushbar assembly illustrated in FIG. 2.

With additional reference to FIG. 8, illustrated therein are certain forces that may be exerted on the latch control assembly 140 during operation of the exit device 90. More specifically, FIG. 8 illustrates a set of actuating forces 180 urging the latch control assembly 140 toward its actuated state, and a set of deactuating forces 190 urging the latch control assembly 140 toward its deactuated state. As will be appreciated, when the actuating forces 180 are overcome by the deactuating forces 190, the latch control assembly 140 will be driven toward its deactuated state. Conversely, when the actuating forces 180 overcome the deactuating forces 190, the latch control assembly 140 will be driven toward its actuated state.

The actuating forces 180 include an upper driver actuating force 182 acting on the upper driver 152, a lower driver actuating force 183 acting on the lower driver 153, and a control link actuating force 186 acting on the control link 142. Each of the driver actuating forces 182, 183 urges the corresponding driver 152/153 in its laterally inward actuating direction. More specifically, the upper driver actuating force 182 urges the upper driver 152 in the downward (Y−) direction, and the lower driver actuating force 183 urges the lower driver 153 in the upward (Y+) direction. The control link actuating force 186 urges the control link 142 in its distal (X−) actuating direction. By way of non-limiting example, factors that may contribute to the control link actuating force 186 include actuation of the drive assembly 120, and the biasing force of the spring 330.

As noted above, the moving components of the latch control assembly 140 are operably connected with one another substantially without lost motion such that the movements and positions of the components are correlated with one another. As a result, an externally-applied input actuating force 188 exerted on one component of the latch control assembly 140 causes a corresponding resultant actuating force 189 to be exerted on each of the other components. In the illustrated form, the input actuating force 188 is typically provided as the control link actuating force 186, and may be exerted by one or more components external to the latch control assembly 140, such as the drive assembly 120 and/or the coordination mechanism 300. Such an input actuating force 186, 188 is transmitted to the drivers 150 by the yoke 144 and pivot cranks 146, thereby providing resultant forces 189 in the form of the driver actuating forces 182, 183.

The deactuating forces 190 include an upper driver deactuating force 192 acting on the upper driver 152, a lower driver deactuating force 193 acting on the lower driver 153, and a control link deactuating force 196 urging the control link 142 in its proximal (X+) deactuating direction. Each of the driver deactuating forces 192, 193 urges the corresponding driver 152/153 in its laterally outward deactuating direction. More specifically, the upper driver deactuating force 192 urges the upper driver 152 in the upward (Y+) direction, and the lower driver deactuating force 193 urges the lower driver 153 in the downward (Y−) direction. By way of non-limiting example, factors that may contribute to the driver deactuating forces 192, 193 include the biasing forces of the springs 228, 238 of the latch mechanisms 220, 230.

As with the actuating forces 180, an externally-applied input deactuating force 198 exerted on one component of the latch control assembly 140 causes a corresponding resultant deactuating force 199 to be exerted on each of the other components. In the illustrated form, the input deactuating force 198 is typically provided as the upper driver deactuating force 192 and/or the lower driver deactuating force 193, each of which may be exerted by the corresponding spring 228/238 via the corresponding connector 112/113. For example, providing the input deactuating force 198 as the lower driver deactuating force 193 causes a resultant deactuating force 199 in the form of the control link deactuating force 196. When both the upper driver 152 and lower driver 153 are being pulled laterally outward by the remote latching assembly 200, both of the driver deactuating forces 192, 193 contribute to input deactuating force 198, thereby exerting an increased resultant force 196, 199 on the control link 142.

Figure 9A:
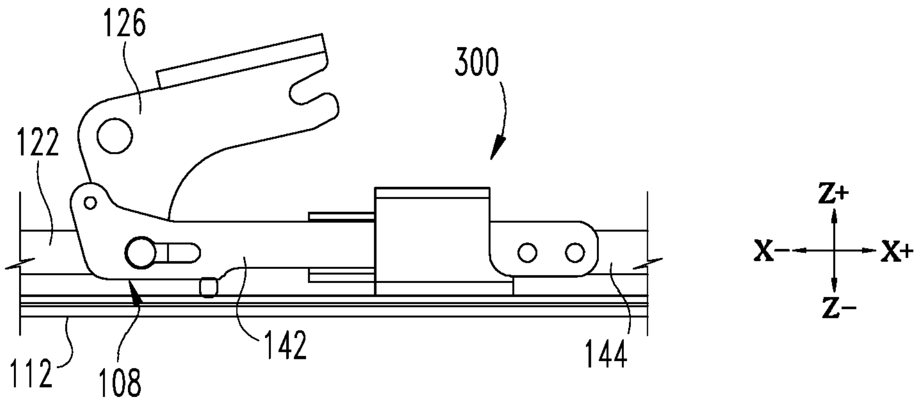
Figure 9B:
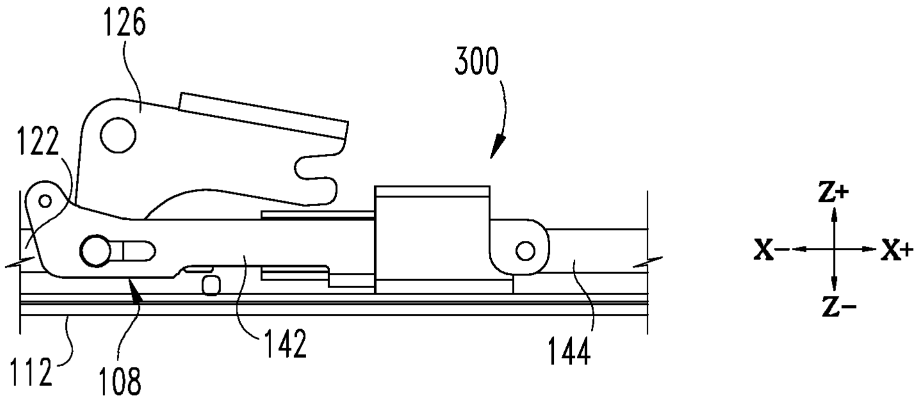
Figure 9C:
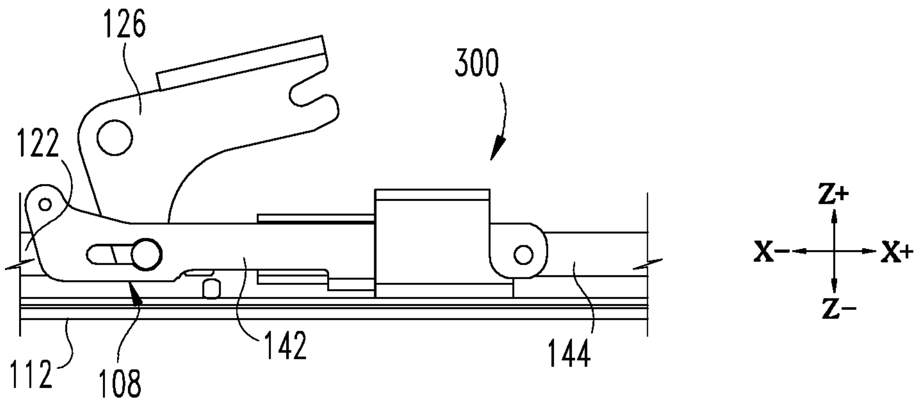

With additional reference to FIG. 9, illustrated therein are the coordination mechanism 300 and a portion of the pushbar assembly 100 in various states corresponding to the above-described conditions of the closure assembly 60. FIG. **9*a* corresponds to the secured condition, in which the drive assembly 120 and the latch control assembly 140 are in the deactuated states thereof, and the coordination mechanism 300 is in a compressed state. FIG. 9*b* corresponds to the unsecured condition, in which the drive assembly 120 and the latch control assembly 140 are in the actuated states thereof, and the coordination mechanism 300 is in an expanded state. FIG. 9*c* corresponds to the open condition, in which the drive assembly 120 is in its deactuated state, the latch control assembly 140 is in its actuated state, and the coordination mechanism is 300** in its expanded state.

FIG. **9*a* illustrates the coordination mechanism 300 with the closure assembly 60 in the secured condition, in which the exit device 90 is deactuated, and the remote latching assembly 200 engages the frame and retains the door 70 in its closed position. In this state, each of the latch mechanisms 220, 230 is in its deactuated state and is engaged with the corresponding one of the strikes 202, 204. With the upper latch mechanism 220 in its deactuated state, the blocking member 227 retains the latchbolt 224 in its latching position, thereby maintaining engagement between the latchbolt 224 and the projection 203. Additionally, the deadlocking features of the lower latch mechanism 230 prevent external pushing forces from driving the deadbolt 234 to its retracted position, thereby preventing the tip of the deadbolt 234 from exiting the pocket 205**.

With the closure assembly 60 in its secured condition, the latch control assembly 140 is in its deactuated state. With the control link 142 in its proximal deactuated position, the spring 330 is compressed between the shoulder 148 and the flange 316. As a result, the coordination mechanism 300 exerts an actuating force 186 on the control link 142, thereby urging the latch control assembly 140 toward its actuated state. Additionally, the springs 228, 238 of the latch mechanisms 220, 230 place the connectors 212, 213 in tension and exert driver deactuating forces 192, 193 that pull the drivers 150 laterally outward. Thus, both the upper latch mechanism spring 228 and the lower latch mechanism spring 238 contribute to the deactuating input force 198, which results in a resultant control link deactuating force 196, 199 that exceeds the actuating control link force 186 exerted by the coordination mechanism 300. As a result, the control link 142 is retained in its proximal position, and the latch control assembly 140 remains in its deactuated state.

From the secured condition, the closure assembly 60 can be transitioned to the unsecured condition by driving the pushbar 124 to its depressed position, thereby actuating the drive assembly 120 and causing a corresponding actuation of the latch control assembly 140. As the latch control assembly 140 moves toward its actuated state, the control link 142 moves toward its distal actuated position, thereby permitting expansion of the spring 330. Additionally, the drivers 150 pull the connectors 212, 213 in the laterally inward actuating direction, and the connectors 212, 213 pull the link members 226, 236 laterally inward against the laterally outward biasing forces of the springs 228, 238, thereby actuating the latch mechanisms 220, 230. With the latch mechanisms 220, 230 in the actuated states thereof, the blocking member 227 is in its unblocking position, and the deadbolt 234 is in its retracted position. As a result, the remote latching assembly 200 does not prevent opening movement of the door 70, and the closure assembly 60 is in the unsecured condition.

With the closure assembly 60 in the unsecured condition, the door 70 is in its closed position, the exit device 90 is actuated, and the coordination mechanism 300 is in the state illustrated in FIG. 9*b*. From the unsecured condition, the door 70 is free to move toward its open position, and the closure assembly 60 can be transitioned to either of the secured condition and the open condition. In order to transition the closure assembly 60 to the secured condition, the user may release the pushbar 124, thereby causing the return spring 127 to return the drive assembly 120 to its deactuated state. Due to the fact that the drive assembly 120 is connected to the latch control assembly 140 via the lost motion connection 108, such deactuation of the drive assembly 120 does not necessarily cause a corresponding deactuation of the latch control assembly 140.

As indicated above, the lost motion connection 108 prevents the drive rod 122 from pushing the control link 142. Accordingly, deactuation of the drive assembly 120 does not exert the deactuating input force 198 required to return the latch control assembly 140 to its deactuated state against the actuating input force 188 exerted by the coordination mechanism 300. With the door 70 in the closed position, however, the deactuating input force 198 is provided in the form of driver deactuating forces 192, 193 exerted by the remote latching assembly 200. More specifically, the upper driver deactuating force 192 is exerted by the upper connector 112 as the spring 228 drives the linkage 226 to return the blocking member 227 to its blocking position, and the lower driver deactuating force 193 is exerted by the lower connector 113 as the spring 238 drives the traveler 236 to return the deadbolt 234 to its extended position. The resultant control link deactuating force 196, 199 is sufficient to overcome the control link actuating force 186 exerted by the coordination mechanism 300. As a result, the latch control assembly 140 returns to its deactuated state.

The closure assembly 60 can also be transitioned from the unsecured condition to the open condition. In order to effect such a transition, the user may urge the door 70 toward its open position, for example by exerting a pushing force on the depressed pushbar 124. As the door 70 moves toward its open position, the projection 203 of the upper strike 202 drives the latchbolt 224 toward its unlatching position. With the door 70 in its open position and the latchbolt 224 in its unlatching position, the user may release the pushbar 124, thereby causing the drive assembly 120 to return to its deactuated state under the force of the return spring 127. As the drive rod 122 moves from its distal actuated position (FIG. 9*b*) to its proximal deactuated position (FIG. 9*c*), the lost motion connection 108 permits the control link 142 to remain in its distal actuated position.

With the closure assembly 60 in the open condition, the spring 238 of the lower latch mechanism 230 urges the traveler 236 in its laterally outward or downward direction. As a result, the lower connector 213 exerts a deactuating input force 193, 198 on the lower driver 153, which causes a resultant deactuating force 192, 199 urging the upper driver 152 in its laterally outward or upward direction. Additionally, the latchbolt 224 is in its unlatching position and retains the blocking member 227 in its blocking position, thereby preventing the spring 228 from driving the linkage 226 in its laterally outward or upward direction. As a result, the input deactuating force 192, 198 exerted on the upper driver 152 is reduced or eliminated.

As will be appreciated, should the lower driver 153 be permitted to move to its deactuated position, the spring 238 will drive the deadbolt 234 to its extended position. If the door 70 is open when this occurs, the deadbolt 234 may strike the floor, and may drag along the floor as the door 70 moves. Both striking and dragging are typically considered undesirable, and can result in objectionable noise and damage to the latch mechanism 230 and/or the floor. However, these results may be obviated by the coordination mechanism 300, which retains the latch control assembly 140 in its deactuated state while the closure assembly 60 is in the open condition.

As noted above, when the closure assembly 60 is in the open condition, the lower connector 213 pulls the lower driver 153 in its laterally outward (downward) direction under the force of the lower latch mechanism spring 238, but the upper connector 212 does not pull the upper driver 152 in its laterally outward (upward) direction. The deactuating input force 198 therefore includes the lower driver deactuating force 193, but does not include the upper driver deactuating force 192. As such, the resultant control link deactuating force 196, 199 is lower in the open condition than in the unsecured condition, in which both the upper latch mechanism spring 228 and the lower latch mechanism spring 238 contribute to the deactuating input force 198. Additionally, the characteristics (e.g., size, shape, and stiffness) of the lower latch mechanism spring 238 and the coordination mechanism spring 330 are selected such that when the coordination mechanism 300 is in the expanded state illustrated in FIG. 9*c*, the actuating input force 188 exerted by the spring 330 exceeds the deactuating control link force 196 imparted by the lower latch mechanism spring 238. The coordination mechanism 300 thus retains the latch control assembly 140 in its actuated state, thereby retaining the lower driver 153 in its actuated state and preventing deactuation of the lower latch mechanism 230.

From the open condition (FIG. 9*c*), the closure assembly 60 can be returned to the secured condition (FIG. 9*a*) by closing the door 70. As the door 70 approaches its closed position, the projection 203 of the upper strike 202 returns the latchbolt 224 to its latching position, thereby freeing the blocking member 226 to return to its blocking position. As the spring 228 drives the linkage 226 laterally outward toward its deactuated position, the upper connector 212 is placed in tension and pulls the upper driver 152 upward, thereby exerting an upper driver deactuating force 192. Thus, both the upper latch mechanism spring 228 and the lower latch mechanism spring 238 contribute to the deactuating input force 198, thereby increasing the resultant deactuating force 196, 199 on the control link 142.

The characteristics (e.g., size, shape, and stiffness) of the latch mechanism springs 228, 238 and the coordination mechanism spring 330 are selected such that when both the upper latch mechanism spring 228 and the lower latch mechanism spring 238 contribute to the deactuating input force 198, the resultant control link deactuating force 196, 199 is sufficient to drive the coordination mechanism 300 from its expanded state (FIG. 9*c*) to its compressed state (FIG. 9*a*). With the deactuating forces 190 imparted by the remote latching assembly 200 exceeding the actuating forces 180 imparted by the coordination mechanism 300, the latch control assembly 140 and the remote latching assembly 200 return to the deactuated states thereof, and the closure assembly 60 transitions to the secured condition.

Due to the fact that the bracket 310 is secured to the mounting assembly 110, the proximal end of the spring 330 is provided with an anchor point having a fixed location within the exit device 90. The compression displacement of the spring 330 (and thus the force exerted on the control link 142) is therefore correlated with the position of the control link 142, and is independent of the actuated/deactuated state of the drive assembly 120. As a result, the coordination mechanism 300 maintains a consistent functionality regardless of whether or not the pushbar 124 is in its depressed position.

In the illustrated embodiment, the coordination mechanism 300 biases the latch control assembly 140 toward its actuated state by exerting an input actuating force 186, 188 on the control link 142. In other embodiments, the coordination mechanism 300 may exert the input actuating force 188 another component of the latch control assembly 140. By way of illustration, the exit device 90 may include one or more header-mounted coordination mechanisms in addition or as an alternative to the illustrated coordination mechanism 300. In such a header-mounted version of the coordination mechanism 300, the anchor bracket may be secured to the header plate 117, and the spring 330 may be engaged with one of the upper driver 152 or the lower driver 153. Additionally or alternatively, the compression spring 330 may be replaced with a torsion spring, which may be engaged between the header plate 117 and a pivot crank 146. Where multiple coordination mechanisms 300 are used, lighter springs may need to be selected to ensure that the total input actuating force 188 remains within the range required to selectively prevent deactuation of the latch control assembly 140 in the manner described above.

As is evident from the foregoing, the coordination mechanism 300 aids in coordinating the movement of the latch mechanisms 220, 230 according to a desired sequence of events. More specifically, the coordination mechanism 300 aids in preventing the lower latch mechanism 230 from moving to its deactuated state while the upper latch mechanism 220 is in its deactuated state, and in causing the lower latch mechanism 230 to move to its deactuated state in response to deactuation of the upper latch mechanism 220. As noted above, the upper latch mechanism 220 will typically return to its deactuated state only when the door 70 returns to its closed position, in which the lower latch mechanism 230 is aligned with the pocket 205. Thus, the coordination mechanism 300 aids in preventing premature extension of the deadbolt 234 and the undesirable consequences thereof, such as dragging along and/or striking the floor.

Additionally, the illustrated coordination mechanism 300 is capable of providing the above-described coordination of bolt movement without requiring the transmission of pushing forces between the pushbar assembly 100 and the remote latch mechanisms 220, 230, and of doing so while installed within the pushbar assembly 100. These capabilities may provide for certain advantages, such as facilitating customization of the exit device 90. For example, while the exit device 90 is illustrated as including a concealed remote latching assembly 200 in which the connectors 212, 213 are provided as pull cables, a pushbar assembly 100 including the coordination mechanism 300 may alternatively be used in combination with a remote latching assembly 200 that is surface-mounted and/or includes push/pull connectors, such as Bowden cables or rigid rods. Thus, a single pushbar assembly 100 may be suitable for use with several different configurations of remote latching assemblies without requiring significant modification, which may reduce the costs associated with the manufacture, inventory, and/or installation of exit devices of varying formats.

The above-mentioned features may also aid in providing the door 70 with increased structural integrity. For example, certain existing exit devices including concealed remote latching assemblies involve the use of rigid rods, which require relatively large channels within the door. In obviating the need for the transmission of pushing forces, however, the coordination mechanism 300 may facilitate the use of flexible pull cables that can be used with a smaller channel preparation, thereby increasing the amount of material that can be provided on either side of the channels. While other existing exit devices include concealed remote latching assemblies having flexible pull cables, some such exit devices coordinate the movement of the latch mechanisms using a device that is installed within a mortise-like cutout in the door. The need for such a mortise-like cutout may be obviated by the coordination mechanism 300, for example when the coordination mechanism 300 is provided within the pushbar assembly 100. With the need for such a cutout obviated, the free edge 75 may be substantially unbroken by the door preparation, which may further increase the structural integrity of the door 70.

With reference to FIG. 10, illustrated therein is a header-mounted coordination mechanism 400 according to certain embodiments, along with a coupling assembly 500 according to certain embodiments. As described herein, the coordination mechanism 400 functions in a manner similar to that described above with reference to the coordination mechanism 300, and the coupling assembly 400 facilitates the coupling of the latch control assembly 140 and the remote latching assembly 200.

In certain embodiments, the header-mounted coordination mechanism 400 maybe used in combination with the above-described coordination mechanism 300, while in other embodiments the coordination mechanism 400 may be used independently of the coordination mechanism 300. The coordination mechanism 400 generally includes an anchor bracket 410 secured to the mounting assembly 110, a cup bracket 420 secured to the yoke 144, and one or more springs 430 engaged between the anchor bracket 410 and the cup bracket 420. While the illustrated embodiment includes three springs 430, it is to be appreciated that more or fewer springs may be utilized in other embodiments.

The anchor bracket 410 includes a plurality of bosses 412, and the cup bracket 420 includes a plurality of cups 422 aligned with the bosses 412. Additionally, a proximal end portion of each spring 430 is engaged with a boss 412, and a distal end portion of each spring 430 is seated in a cup 422. The springs 430 are thus captured between the anchor bracket 410 and the cup bracket 420, and are operable to exert a distal biasing force on the yoke 144. In this manner, the coordination mechanism 400 is operable to bias the latch control assembly 140 toward its actuated state and to resist movement of the latch control assembly 140 toward its deactuated state. The coordination mechanism 400 thereby operates in a manner analogous to that described above with reference to the coordination mechanism 300 such that the coordination mechanism 400 is operable to selectively retain the lower latch mechanism 230 in its actuated state, and to allow the lower latch mechanism 230 to return to its deactuated state in response to deactuation of the upper latch mechanism 220.

With additional reference to FIGS. 11 and 12, the coupling assembly 500 is configured to be used in place of the above-described lift finger 156, and may provide for increased ease of installation relative to the arrangement illustrated in FIG. 3. Also illustrated in FIGS. 11 and 12 is a cable 502 that can be connected to one of the latch mechanisms 220, 230 to serve the functions of the corresponding connector cable 212, 213. The coupling assembly 500 generally includes a guide member 510 configured for mounting to the driver 150, a retaining member 520 that aids in retaining the guide member 510 relative to the driver 150, and a compression fitting 530 seated in the guide member 510.

The guide member 510 generally includes a body portion 512 having a cavity 513 and an opening 514, and a cable guide 516 having a through-passage 517 connected with the cavity 513. The retaining member 520 includes a body portion 522 having a flat 523 formed thereon, a post 524 formed on one end of the body portion 522, and an arm 526 formed on the opposite end of the body portion 522. The guide member 510 is seated in the opening 155 of the driver 150 such that the cable guide 516 extends beyond the rear surface of the header plate 116. The body portion 522 of the retaining member 520 extends through another opening in the driver 150 such that a portion of the driver 150 is captured between the arm 526 and the guide member body portion 512. Additionally, the post 524 is received in the opening 514 such that the retaining member 520 restrains the guide member 510 from moving transversely. This arrangement is maintained by a screw 504, which is threaded through the captured portion of the driver 150 and is engaged with the flat 523.

The compression fitting 530 includes a first member 532 that is seated in the cavity 513, a second member 534 rotatably mounted to the first member 532, a manually-graspable turn piece 535 formed on the second member 534, and a clamp 536 mounted in the first member 532 and engaged with the second member 534. The cable 502 passes through the compression fitting 530 such that a portion of the cable 502 is received in the clamp 536, and such that the cable 502 exits the compression fitting 530 via an opening in the turnpiece 535. The internal surfaces of the clamp 536 include ridges that grip the cable 502 when the clamp 536 is compressed, and which release the cable 502 when the clamp 536 is expanded. The clamp 536 is engaged with the second member 534 such that rotation of the second member 534 in opposite directions compresses and expands the clamp 536.

With the exit device 100 mounted to the door 70, the cable guide 516 extends through the door preparation 80 and directs the cable 502 toward the appropriate one of the latch mechanisms 220, 230. Thus, like the lift finger 156, the coupling assembly 500 facilitates the coupling of the remote latching assembly 200 with the latch control assembly 140. Unlike the arrangement illustrated in FIG. 3, however, the coupling assembly 500 also directs the cable 502 to extend through the door preparation 80 and the latch control assembly 140 to a location at which the end of the cable 502 is more readily accessible, thereby facilitating the installation process. As described herein, the installation process is further facilitated by other features of the coupling assembly 500, such as the compression fitting 530.

With additional reference to FIG. 13, illustrated therein is an example process 600 for installing the exit device 100 to the door 70 using the coupling assembly 500. Operations illustrated for the processes in the present application are understood to be examples only, and operations may be combined or divided, and added or removed, as well as re-ordered in whole or in part, unless explicitly stated to the contrary.

The process 600 may begin with an operation 602 that generally involves partially installing the remote latching assembly 200 to the door 70. More particularly, the operation 602 involves installing the upper latch mechanism 220 to the upper cavity 82 and running the upper connector 212 through the upper channel 84 and out the upper aperture 86. Similarly, the operation also involves installing the lower latch mechanism 230 to the lower cavity 83 and running the lower connector 213 through the lower channel 85 and out the lower aperture 87.

The process 600 also includes an operation 604 that generally involves installing two instances of the coupling assembly 500 to the latch control assembly 140. One of the coupling assemblies 500 is mounted to one of the drivers by inserting the guide member 510 through the opening 155 in the driver 150 such that the cable guide 516 extends beyond the rear surface of the header plate 116. The compression fitting 530 is coupled to the guide member 510 such that the turnpiece 535 is accessible from the exposed front side of the latch control assembly 140. The retaining member 520 is then inserted and the screw 504 is installed to affix the coupling assembly 500 to the driver 150 in the manner described above. These steps are then repeated to install and affix the other coupling assembly 500 to the other driver 150.

After installing the remote latching assembly 200 to the door 80 and installing the coupling assemblies 500 to the latch control assembly 140, the process 600 includes an operation 606, which generally involves passing the cables 212, 213 through the coupling assemblies 600, as illustrated in FIG. 14. This operation 606 may begin with positioning the device close to the door 70, and inserting an end portion 503 of each cable 502 into the opening 517 of the appropriate cable guide 516. As the user urges the cables 502 through the coupling mechanisms 500, the end portions 503 emerge from the exposed ends of the compression fittings 530, which are in a loosened state so as to permit the cables 502 to pass through the clamps 536. The device is then placed against the door 70 such that the cable guides 516 extend through the apertures 86, 87, and the end portions 503 are pulled to remove slack from the cables 502.

Following the operation 606, the process 600 proceeds to an operation 608, which generally involves mounting the pushbar assembly 100 to the door 70. The process 600 also includes an operation 610, which generally involves dogging the exit device 100. More particularly, the operation 610 involves depressing the pushbar 124 to actuate the drive assembly 120, and manipulating the dogging mechanism 130 to retain the drive assembly 120 in its actuated state. With the pushbar assembly 100 mounted to the door 70 and in the dogged state, the process 600 may proceed to operations 612, 614, which generally involve securing the cables 502 to the drivers 150 when the latch mechanisms 220, 230 are in predetermined states.

The operation 612 begins with the upper latch mechanism 220 in its deactuated state, in which the latchbolt 224 is in its latching position, and the blocking member 227 is in its blocking position. In this state, the user urges the latchbolt 224 toward its unlatching position while slowly pulling the exposed portion of the upper cable 212. The blocking member 227 retains the latchbolt 224 in its latching position until the blocking member 227 reaches its unblocking position, at which point the latchbolt 224 moves to its unlatching position under the force applied by the user. This movement of the latchbolt indicates to the user that the upper latching mechanism 220 has reached the actuated state corresponding to the actuated state of the drive assembly 120, and that the cable 212 is of the appropriate effective length. The user then operates the compression fitting 530 to secure the cable 212 to the driver 152 while the cable 212 is of the appropriate effective length. More specifically, the user rotates the second member 534 using the turnpiece 535 to compress the clamp 536 such that the clamp 536 is secured to the cable 212. In this state, the upper coupling assembly 500 secures the cable 212 to the upper driver 152 and retains the appropriate effective length of the cable 212.

The operation 614 is similar to the operation 612, and begins with the lower latch mechanism 230 in the deactuated state, in which the deadbolt 234 is in its extended position. The user slowly pulls the exposed portion of the lower cable 213 until the deadbolt 234 is capable of clearing the pocket 205 and will not drag on the floor. This position indicates to the user that the lower latching mechanism 230 has reached the actuated state corresponding to the actuated state of the drive assembly 120, and that the cable 213 is of the appropriate effective length. The user then operates the compression fitting 530 to secure the cable 213 to the driver 153 in a manner similar to that described above with reference to the operation 612. With the operation 614 completed, the lower coupling assembly 500 secures the cable 213 to the lower driver 153 and retains the appropriate effective length of the cable 213.

After completing the operations 612, 614, the process 600 proceeds to an operation 616, which generally involves trimming off the exposed end portions 503 of the cables 212, 213. The operation 616 may involve leaving a certain excess length to facilitate later adjustment of the effective lengths of the cables 212, 213. Such adjustment may also be facilitated by the compression fittings 530, which can be loosened to release the corresponding cable 502 and subsequently tightened when the appropriate effective length has been obtained.

With reference to FIG. 15, illustrated therein is a coordination mechanism 700 according to certain embodiments. The coordination mechanism 700 includes a first bracket 710, a second bracket 720 slidably engaged with the first bracket 710, and a spring 730 engaged between the first and second brackets 710, 720. The first bracket 710 defines a chamber 712 that is delimited by an end wall 713, and which has a slot 714 formed in one side thereof. The second bracket 720 includes an arm 722 that projects into the chamber 712 via the slot 722, and which has a post 723 projecting therefrom. The spring 730 is seated in the chamber 720 and is engaged between the brackets 710, 720. More particularly, the lower end 731 of the spring 730 is engaged with the end wall 713, and the upper end portion 732 of the spring 730 is mounted to the post 723.

With additional reference to FIG. 16, illustrated therein is the coordination mechanism 700 installed to the pushbar assembly 100, portions of which have been omitted for clarity. The first bracket 710 is secured to the mounting assembly 110 and the second bracket 720 is secured to the lower driver 152 such that the spring 730 biases the second bracket 720 in the upward direction. As a result, the coordination mechanism 700 urges the lower driver 152 in its upward actuating direction and resists movement of the lower driver 152 in its downward deactuating direction. The coordination mechanism 700 is therefore operable to function in a manner substantially similar to the above-described coordination mechanisms 300, 400, with the difference that the component on which the coordination mechanism 700 acts is the lower driver 152. This arrangement may be capable of taking up a greater degree of slack or play between the upper latch mechanism and the driver 152, which may be advantageous in certain circumstances.

Also illustrated in FIG. 16 is a connection assembly 750 according to certain embodiments. The connection assembly 750 includes a lift finger 752 that is coupled to the driver 152, and which extends through the header plate 116 and terminates in a pair of jaws 753. The jaws 753 are clamped onto a carriage 754 to which the upper end 215 of the lower cable 213 is coupled. An adjustment mechanism 756 facilitates adjustment of the vertical position of the lift finger 752 and carriage 754. More particularly, a screw 757 can be loosened to allow for adjustment of the vertical position of the lift finger 752, for example to remove slack from the cable 213, and can be tightened to secure the lift finger 752 in a selected location.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A pushbar assembly, comprising:

a drive assembly configured for movement between a first actuated state and a first deactuated state, and wherein the drive assembly includes a pushbar operable to transition the drive assembly between the first actuated state and the first deactuated state;

a latch control assembly configured for movement between a second actuated state and a second deactuated state;

a lost motion connection operably connecting the drive assembly and the latch control assembly, wherein the lost motion connection is configured to move the latch control assembly from the second deactuated state to the second actuated state in response to movement of the drive assembly from the first deactuated state to the first actuated state, and wherein the lost motion connection is further configured to permit the latch control assembly to remain in the second actuated state when the drive assembly moves from the first actuated state to the second deactuated state; and a coordination mechanism engaged with the latch control assembly and urging the latch control assembly toward the second actuated state with an actuating input force, and wherein the actuating input force is independent of the first actuated state and the first deactuated state.

2. The pushbar assembly of claim 1, further comprising a remote latching assembly operably connected with the latch control assembly, the remote latching assembly comprising:

a first latch mechanism operably connected with the latch control assembly, wherein the first latch mechanism is operable to move from a first deactuated state toward a first actuated state in response to actuation of the latch control assembly;

a second latch mechanism operably connected with the latch control assembly, wherein the second latch mechanism is operable to move from a second deactuated state toward a second actuated state in response to actuation of the latch control assembly;

a first biasing member urging the first latch mechanism toward the first deactuated state such that the first latch mechanism exerts a first deactuating force on the latch control assembly; and a second biasing member urging the second latch mechanism toward the second deactuated state such that the second latch mechanism exerts a second deactuating force on the latch control assembly.

3. The pushbar assembly of claim 2, wherein the coordination mechanism includes a coordination mechanism biasing member urging the latch control assembly toward the latch control assembly second actuated state with the actuating input force.

4. The pushbar assembly of claim 2, wherein the pushbar has a projected position in the drive assembly first deactuated state and a depressed position in the drive assembly first actuated state; and wherein the drive assembly further comprises a return spring biasing the drive assembly toward the drive assembly first deactuated state.

5. The pushbar assembly of claim 2, wherein the first latch mechanism is operably connected with the latch control assembly via a first connector;

wherein the first latch mechanism comprises a first housing and a first linkage movably mounted to the first housing, and wherein the first linkage has a first linkage deactuated position in the first latch mechanism deactuated state and a first linkage actuated position in the first latch mechanism actuated state;

wherein the first biasing member is mounted to the first housing and biases the first linkage toward the first linkage deactuated position;

wherein the first connector is connected with the first linkage and is configured to drive the first linkage toward the first linkage actuated position in response to actuation of the latch control assembly;

wherein the second latch mechanism is positioned at a second location remote from the actuation assembly and is operably connected with the latch control assembly via a second connector;

wherein the second latch mechanism comprises a second housing and a second linkage movably mounted to the second housing, and wherein the second linkage has a second linkage deactuated position in the second latch mechanism deactuated state and a second linkage actuated position in the second latch mechanism actuated state;

wherein the second biasing member biases the second linkage toward the second linkage deactuated position; and wherein the second connector is connected with the second linkage and is configured to drive the second linkage toward the second linkage actuated position in response to actuation of the latch control assembly.

6. The pushbar assembly of claim 5, wherein the first latch mechanism further comprises a latchbolt configured for movement between a latching position and an unlatching position;

wherein the first latch mechanism further comprises a blocking member operably connected with the first linkage, the blocking member having a blocking position in response to the first linkage deactuated position, and the blocking member having an unblocking position in response to the first linkage actuated position;

wherein, with the blocking member in the blocking position, the blocking member retains the latchbolt in the latching position;

wherein, with the blocking member in the unblocking position, the blocking member does not block movement of the latchbolt between the latching position and the unlatching position; and wherein the second latch mechanism further comprises a deadbolt movably mounted to the second housing and engaged with the second linkage, the deadbolt having an extended position in response to the second linkage deactuated position, and the deadbolt having a retracted position in response to the second linkage actuated position.

7. The pushbar assembly of claim 6, wherein the remote latching assembly further comprises a retaining member operable to retain the first latch mechanism in the first actuated state by moving between a retaining position and a non-retaining position; and wherein the retaining member is configured to permit movement of the blocking member between the blocking position and the unblocking position when the latchbolt is in the latching position, and to retain the blocking member in the unblocking position when the latchbolt is in the unlatching position.

8. The pushbar assembly of claim 2, wherein the coordination mechanism further comprises an anchor bracket, and wherein the coordination mechanism includes a biasing member engaged between the anchor bracket and the latch control assembly.

9. The pushbar assembly of claim 1, further comprising a mounting assembly configured for mounting to a door;

wherein the latch control assembly includes a movable component mounted for movement relative to the mounting assembly, the movable component having an actuated position in the second actuated state, and the movable component having a deactuated position in the second deactuated state;

wherein the coordination mechanism comprises an anchor bracket and a biasing member; wherein the biasing member is engaged between the anchor bracket and the movable component and exerts an actuating force urging the movable component toward the actuated position, thereby contributing to the actuating input force; and wherein the anchor bracket is fixedly mounted to the mounting assembly and provides an anchor point for the actuating force exerted by the biasing member.

10. The pushbar assembly of claim 9, wherein the biasing member has a first end portion and an opposite second end portion, wherein the anchor bracket is engaged with the first end portion and limits movement of the first end portion in a first direction, and wherein the movable component is engaged with the second end portion and limits movement of the second end portion in a second direction opposite the first direction.

11. The pushbar assembly of claim 10, wherein the anchor bracket defines a channel and includes a flange projecting into the channel, wherein the biasing member is received in the channel, and wherein the flange is engaged with the first end portion.

12. The pushbar assembly of claim 1, wherein the latch control assembly is urged toward the second actuated state by a cumulative actuating force, and wherein the latch control assembly is urged toward the second deactuated state by a cumulative deactuating force;

wherein the pushbar assembly further includes a remote latching assembly comprising:

a first latch mechanism positioned remotely from the case, wherein the first latch mechanism is operably connected with the latch control assembly via a first connector such that actuation of the latch control assembly causes a corresponding actuation of the first latch mechanism, and wherein the first latch mechanism is configured to selectively exert a first deactuating force contributing to the cumulative deactuating force; and a second latch mechanism positioned remotely from the case, wherein the second latch mechanism is operably connected with the latch control assembly via a second connector such that actuation of the latch control assembly causes a corresponding actuation of the second latch mechanism, and wherein the second latch mechanism is configured to exert a second deactuating force contributing to the cumulative deactuating force;

wherein the pushbar assembly has a first condition in which the first deactuating force contributes to the cumulative deactuating force, the cumulative deactuating force exceeds the cumulative actuating force, and the latch control assembly is biased to the second deactuated state; and wherein the pushbar assembly has a second condition in which the first deactuating force does not contribute to the cumulative deactuating force, the cumulative actuating force exceeds the cumulative deactuating force, and the latch control assembly is biased to the second actuated state.

13. The pushbar assembly of claim 12, wherein the first latch mechanism comprises a first bolt having a first extended position and a first retracted position;

wherein the second latch mechanism comprises a second bolt having a second extended position and a second retracted position;

wherein the first latch mechanism is configured to retain the first bolt in the first extended position when the first latch mechanism is deactuated; and wherein the second latch mechanism is configured to retain the second bolt in the second extended position when the second latch mechanism is deactuated.

14. The pushbar assembly of claim 13, wherein the coordination mechanism is configured to exert the actuating input force contributing to the cumulative actuating force.

15. A system including the pushbar assembly of claim 12, the system further comprising a door having a first face, a second face opposite the first face, a top edge, a bottom edge opposite the top edge, a hinge edge, and a swinging edge opposite the hinge edge;

wherein the pushbar assembly is mounted to the first face of the door;

wherein the first latch mechanism is mounted to the door adjacent the top edge;

wherein the second latch mechanism is mounted to the door adjacent the bottom edge; and wherein each of the first latch mechanism and the second latch mechanism is nearer to the swinging edge than to the hinge edge.

16. The system of claim 15, wherein the door further comprises a door preparation in which the remote latching assembly is positioned;

wherein the door preparation comprises:

an upper cavity extending downward from the top edge, wherein the first latch mechanism is seated in the upper cavity;

an upper channel extending downward from the upper cavity, wherein the first connector extends through the upper channel;

a lower cavity extending upward from the bottom edge, wherein the second latch mechanism is seated in the lower cavity; and a lower channel extending upward from the lower cavity, wherein the second connector extends through the lower channel; and wherein the free edge of the door is substantially unbroken by the door preparation.

17. A pushbar assembly, comprising:

a drive assembly configured for movement between a first actuated state and a first deactuated state via actuation of a pushbar;

a latch control assembly configured for movement between a second actuated state and a second deactuated state;

a lost motion connection operably connecting the drive assembly and the latch control assembly, wherein the lost motion connection is configured to move the latch control assembly from the second deactuated state to the second actuated state in response to movement of the drive assembly from the first deactuated state to the first actuated state, and wherein the lost motion connection is further configured to permit the latch control assembly to remain in the second actuated state when the drive assembly moves from the first actuated state to the second deactuated state; and a coordination mechanism engaged with the latch control assembly and urging the latch control assembly toward the second actuated state with an actuating input force, wherein the actuating input force is independent of the first actuated state and the first deactuated state.

18. The pushbar assembly of claim 17, wherein the latch control assembly includes a movable component having an actuated position in the second actuated state, and the movable component having a deactuated position in the second deactuated state; and wherein the coordination mechanism comprises a biasing member engaged with the movable component and exerting an actuating force to urge the movable component toward the actuated position, thereby contributing to the actuating input force.

19. A pushbar assembly, comprising:

a pushbar drive assembly configured for movement between a drive actuated state and a drive deactuated state;

a latch control assembly configured for movement between a latch actuated state and a latch deactuated state;

a lost motion connection operably connecting the drive assembly and the latch control assembly, wherein the lost motion connection is configured to move the latch control assembly from the latch deactuated state to the latch actuated state in response to movement of the drive assembly from the drive deactuated state to the drive actuated state, and wherein the lost motion connection is further configured to permit the latch control assembly to remain in the latch actuated state when the drive assembly moves from the drive actuated state to the drive deactuated state; and a coordination mechanism engaged with the latch control assembly and urging the latch control assembly toward the latch actuated state with an actuating input force, wherein the actuating input force is independent of the drive actuated state and the drive deactuated state.

20. The pushbar assembly of claim 19, wherein the latch control assembly includes a movable component having an actuated position in the latch actuated state, and the movable component having a deactuated position in the latch deactuated state; and wherein the coordination mechanism comprises a biasing member engaged with the movable component and exerting an actuating force to urge the movable component toward the actuated position, thereby contributing to the actuating input force.

* * * * *